United States Patent [19]
Akiyama et al.

[11] Patent Number: 5,623,548
[45] Date of Patent: Apr. 22, 1997

[54] TRANSFORMATION PATTERN GENERATING DEVICE AND ENCRYPTION FUNCTION DEVICE

[75] Inventors: Ryota Akiyama; Naoya Torii; Noboru Iwayama; Kenichi Utsumi, all of Kawasaki, Japan

[73] Assignee: Fujitsu Limited, Kawasaki, Japan

[21] Appl. No.: 370,881

[22] Filed: Jan. 10, 1995

[30] Foreign Application Priority Data

Jan. 10, 1994 [JP] Japan .................................. 6-000997
Dec. 19, 1994 [JP] Japan .................................. 6-314879
Dec. 21, 1994 [JP] Japan .................................. 6-318221

[51] Int. Cl.$^6$ ........................................................ H04L 9/00
[52] U.S. Cl. ................................................. 380/28; 380/29
[58] Field of Search ................................ 380/28, 29, 48

[56] References Cited

U.S. PATENT DOCUMENTS

| | | | |
|---|---|---|---|
| 4,274,085 | 6/1981 | Marino, Jr. ................................ | 380/28 |
| 4,447,672 | 5/1984 | Nakamura ................................ | 380/48 |
| 4,484,025 | 11/1984 | Ostermann et al. ..................... | 380/28 |
| 4,663,500 | 5/1987 | Okamoto et al. ........................ | 380/48 |
| 4,731,843 | 3/1988 | Holmquist ................................ | 380/29 |
| 4,760,599 | 7/1988 | Okamoto et al. ........................ | 380/48 |
| 4,760,600 | 7/1988 | Nakai ........................................ | 380/28 |
| 4,802,217 | 1/1989 | Michener .................................. | 380/29 |
| 5,001,753 | 3/1991 | Davio et al. .............................. | 380/29 |
| 5,003,597 | 3/1991 | Merkle et al. ............................ | 380/28 |
| 5,134,656 | 7/1992 | Kudelski . | |
| 5,214,701 | 5/1993 | Quisquater ............................... | 380/29 |
| 5,511,123 | 4/1996 | Adams ...................................... | 380/29 |

FOREIGN PATENT DOCUMENTS

| | | |
|---|---|---|
| 277247 | 8/1988 | European Pat. Off. . |
| 2216754 | 10/1989 | United Kingdom . |
| 2261348 | 2/1992 | United Kingdom . |

OTHER PUBLICATIONS

"Fast Data Encipherment Algorithm FEAL," Shimizu et al., Eurocrypt '87, Apr. 1987, pp. 267–278.
"Differential Cryptanalysis of DES-like Cryptosystems," Biham and Shamir, Journal of Cryptology, vol. 4, 1991, pp. 3–72.

*Primary Examiner*—Salvatore Cangialosi
*Attorney, Agent, or Firm*—Staas & Halsey

[57] ABSTRACT

In accordance with the present invention, there is provided a transformation pattern generating mechanism comprising: a key input section for inputting a key for encryption; a transformation pattern generating section for generating a transformation pattern for transformation of input data; and an output section for outputting the generated transformation pattern; wherein, when a number sequence corresponding to a predetermined transformation pattern is input as the key to the key input section, said transformation pattern generating section generates and outputs the predetermined transformation pattern corresponding to the number sequence.

16 Claims, 19 Drawing Sheets

| 0 | 1 | 2 | 3 | 4 | 5 | 6 | 7 | (BIT) |
|---|---|---|---|---|---|---|---|---|
| 1 | 4 | 7 | 6 | 2 | 3 | 5 | 0 | |

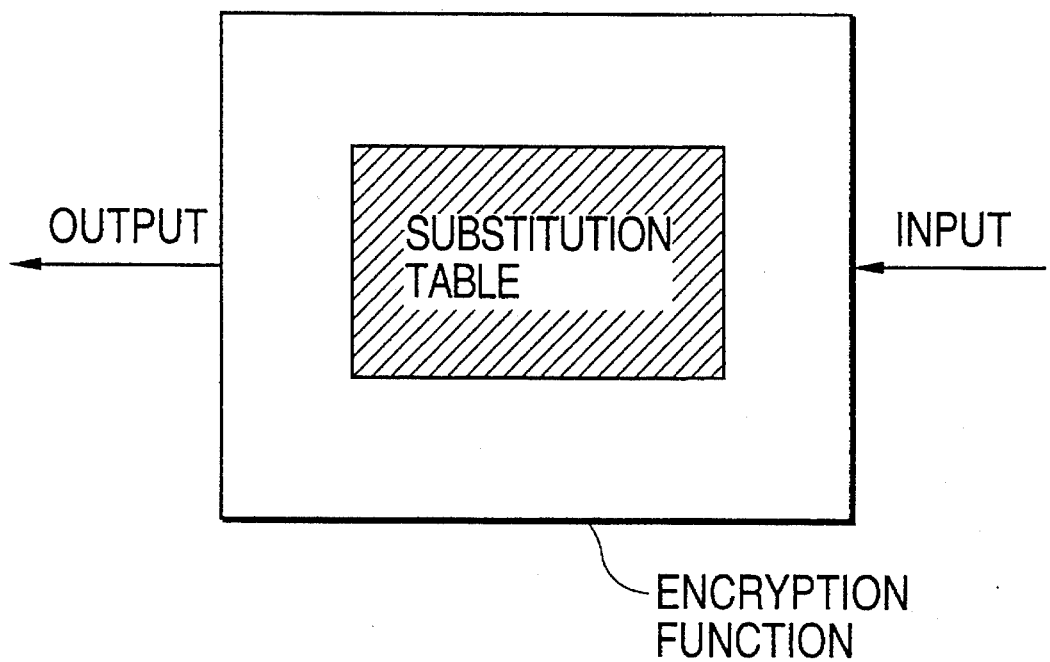

SUBSTITUTION S1

| | 0 | 1 | 2 | 3 | 4 | 5 | 6 | 7 | 8 | 9 | 10 | 11 | 12 | 13 | 14 | 15 | ← COLUMN |
|---|---|---|---|---|---|---|---|---|---|---|---|---|---|---|---|---|---|
| 0 | 14 | 4 | 13 | 1 | 2 | 15 | 11 | 8 | 3 | 10 | 6 | 12 | 5 | 9 | 0 | 7 | |
| 1 | 0 | 15 | 7 | 4 | 14 | 2 | 13 | 1 | 10 | 6 | 12 | 11 | 9 | 5 | 3 | 8 | |
| 2 | 4 | 1 | 14 | 8 | 13 | 6 | 2 | 11 | 15 | 12 | 9 | 7 | 3 | 10 | 5 | 0 | |
| 3 | 15 | 12 | 8 | 2 | 4 | 9 | 1 | 7 | 5 | 11 | 3 | 14 | 10 | 0 | 6 | 13 | |

↑ ROW

TRANSFORMATION PATTERN GENERATING DEVICE AND ENCRYPTION FUNCTION DEVICE

BACKGROUND OF THE INVENTION

1. Field of the Invention

The present invention relates to transformation pattern generating devices and encryption function devices, and more particularly to transformation pattern generating devices and encryption function devices for the encryption and decryption of data through a parallel randomization process having a particularly high randomization effect.

2. Description of the Related Arts

In these days, rapidly prevailing computer systems and networks for the interconnection thereof attach a great importance to the security in the networks for the prevention of eavesdrop and falsification of communication data and computer data.

In particular, data encryption is indispensable as a core technology to ensure the network security.

If cryptographic techniques are utilized for data communications not only in military and diplomatic fields but also in civilian businesses and R&D, software applications and the like incorporating a cryptographic system and encryption mechanism may be easily available to everyone, and hence encryption algorithms used therein may be known to many people.

Therefore, cryptographic techniques ensuring the security based on the secrecy of the algorithms thereof are insecure. In this connection, there have been proposed cryptographic techniques that ensure the security based on secret keys and allow anyone to use the algorithms thereof which are open to the public.

One of such cryptographic techniques is DES (Data Encryption Standard; National Bureau of Standard, Federal Information Processing Standards Publications, 46 January 1977).

FIG. 12 is a diagram for explaining an example of DES cryptosystem. In DES, input plaintext to be enciphered is divided into higher-level bits L0 (e.g., 32 bits) and lower-level bits R0 (e.g., 32 bits), and then the lower-level bits or bit sequence data obtained through an exclusive-OR (EOR) operation are subjected to a data randomization process performed by an encryption function f.

As shown in FIG. 12, the bit sequence data obtained through this process are further processed by iterating the exclusive-OR (EOR) operation and data randomization process by the encryption function f several times, and finally transformed into ciphertext data.

In FIG. 13, there is a model of a process performed in a DES encryption function. In the encryption function, the bit sequences of plaintext data are processed through such processing operations as an expansion permutation (E), substitution table (S-box), balanced permutation (P) and exclusive-OR operation by using externally input keys, i.e., secret bit sequences of data. These processing operations are predetermined and fixed.

This encryption function is open to the public, so that anyone can know the algorithm thereof. However, the encryption function is arranged so that the secret keys cannot easily be identified.

Cryptosystems like DES in which a data randomization element called encryption function is repeatedly utilized for encryption are referred to as involution-type cryptosystem.

Another example of the involution-type cryptosystem is FEAL (Fast Data Encryption Algorithm; Shimizu et al, Fast Data Encipherment Algorithm FEAL, EUROCRYPT'87, April 1987).

However, the security of these cryptosystems is not enough, because cryptanalyses for breaking the cryptosystems have been proposed. For example, a known plaintext attack called differential attack is widely used as a cryptanalysis that can generally be applied to the involution-type cryptosystems. The differential attack is designed to infer a secret key used for the encryption from ciphertext data and plaintext data, which is detailed in Differential Cryptanalysis of DES-like Cryptosystems, Biham and Shamir, Journal of Cryptology, Vol. 4, pp. 3–72, 1991.

The differential attack is based on the following principle. It is assumed that, when two plaintext sequences with a fixed difference $\Delta$(exclusive OR-value) are enciphered through an N-round involution-type encryption algorithm, a difference $\Delta'$ which may take various values is observed in the (N−1)-th round. A differential pair $\Delta$ and $\Delta'$ is called a characteristic. If the characteristic $(\Delta,\Delta')$ occurs with a significantly high probability, a secret key in the final round (the N-th round) is identified from the difference $\Delta'$ and a ciphertext sequence through a round-robin search.

In DES, the probability of occurrence of the aforesaid particular differential pair (characteristic) can be relatively easily calculated. As shown in FIG. 13, the encryption functions employed for DES include a permutation, block substitution and exclusive-OR with a key, and the permutation and substitution are always fixed. Therefore, probable differential outputs for a particular differential input can be relatively easily counted, and hence the calculation of the probability of occurrence of each differential pair is relatively easy.

To cope with differential attack, there have been various proposals for reducing the probability of occurrence of each differential pair. For example, the probability of occurrence of each differential pair can be reduced by increasing the number of rounds. Even if the number of rounds is increased, however, the probability of occurrence of each differential pair can be calculated. That is, differential attack is still possible, though it may require more labor.

SUMMARY OF THE INVENTION

In view of the foregoing, it is an object of the present invention to provide a transformation pattern generating device and encryption function device which can disable differential attack through the key-dependent alteration of a permutation mechanism or substitution table structure in the encryption function and realize a cryptosystem virtually unbreakable through the differential attack.

The present invention provides a transformation pattern generating device comprising a key input means which can input a key for encryption; a transformation pattern generating means for recognizing the key as a number sequence and for generating a transformation pattern for transformation of a data; and an output means for outputting the generated transformation pattern.

The present invention also provides a transformation pattern generating device comprising a key input means which can input a key for encryption, a random number generating means for generating a pseudo-random number sequence including a plurality of random numbers using the key from the key input means as a seed, a transformation pattern generating means for generating a transformation pattern based on a pseudo-random number sequence generated by the random number generating means and an output means for outputting the generated transformation pattern.

Further, the present invention provides an encryption function device comprising the transformation pattern generating device, and a transformation means, wherein the input means in the transformation pattern generating device has a function for data input, and the transformation means transforms a data in accordance with a transformation pattern generated by the transformation pattern generating means.

Further, the present invention provides a cryptographic system comprising: an input means for inputting a key and data of plural bits; the aforesaid transformation pattern generating device; a plurality of encryption function devices each including a permutation means for permuting a bit sequence of the data of plural bits on a bit-by-bit basis; wherein permutation patterns generated by the transformation pattern generating device are respectively provided to said encryption function devices, and the permutation means in each of the encryption function devices permutes the bit sequence of the data in accordance with the provided permutation pattern.

With such constructions of the transformation pattern generating devices, the transformation pattern is generated in correspondence to a number sequence which is input as a key for the encryption. Accordingly, the transformation pattern is not a predetermined fixed one, but can be changed in a key-dependent manner. Therefore, the present invention realizes an encryption function device invulnerable to differential attack.

Further, substitution tables or permutation patterns of the respective encryption functions of plural rounds can be determined by generating a random number sequence based on a fixed key input as a seed to the random number generator. Therefore, it is not necessary to increase the bit length of the key for determining plural substitution tables and permutation patterns, thereby reducing the storage area for storing the key.

BRIEF DESCRIPTION OF THE DRAWINGS

FIG. 7 is a block diagram illustrating the structure of an encryption function in accordance with EMBODIMENT 2 of the present invention.

FIG. 8 is a diagram for explaining an exemplary substitution table.

FIG. 14 is a diagram for explaining an exemplary substitution table (S1).

DESCRIPTION OF THE PREFERRED EMBODIMENTS

Figure 1:
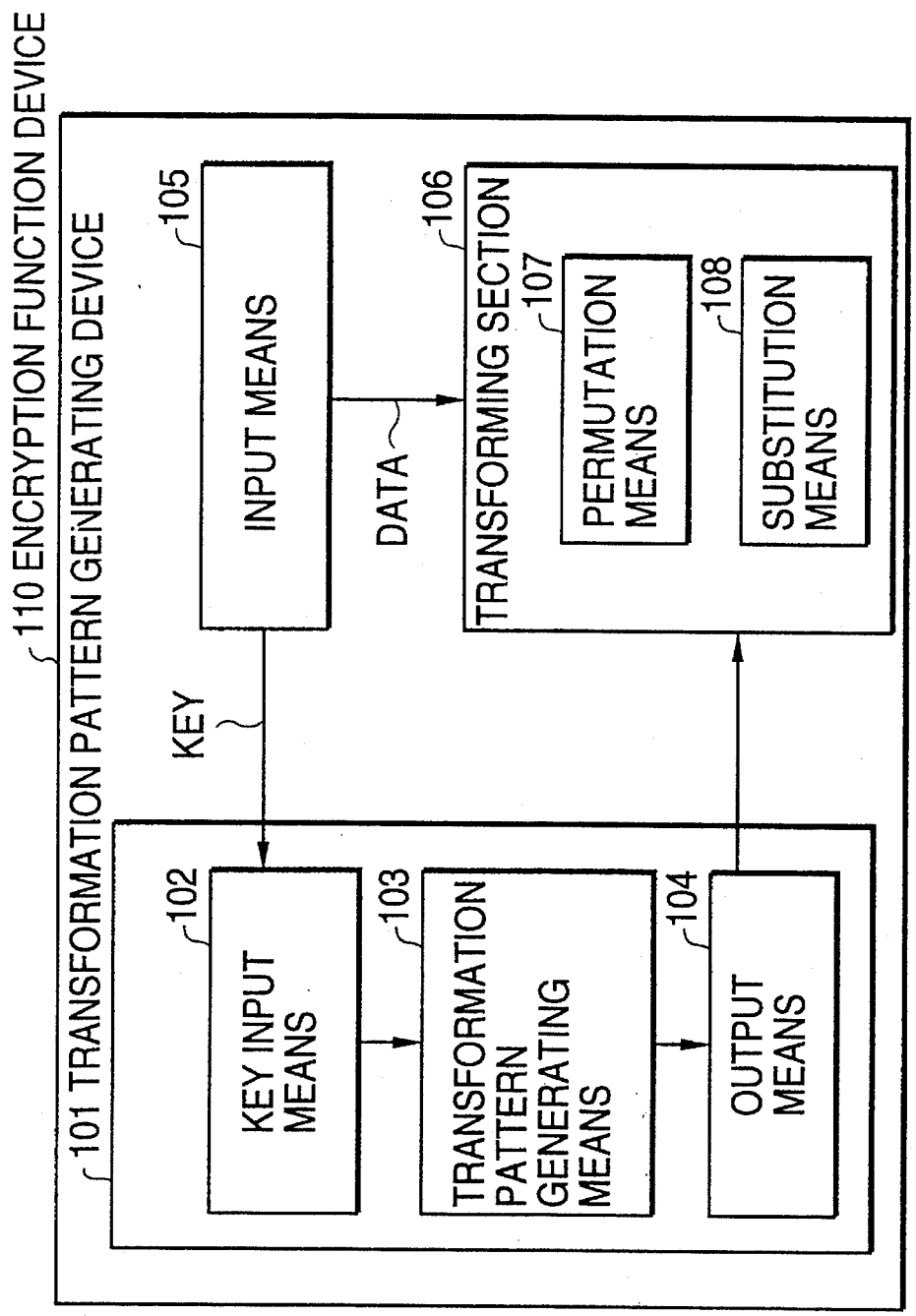
FIG. 1 is a block diagram illustrating the fundamental construction of an encryption function device in accordance with the present invention.

In accordance with one embodiment of the present invention, a transformation pattern generating device 101 as shown in FIG. 1 comprises a key input means 102 for inputting a key for encryption, a transformation pattern generating means 103 for generating a transformation pattern for transformation of a data, and an output means 104 for outputting the generated transformation pattern. The transformation pattern generating means 103 generates a predetermined transformation pattern corresponding to a number sequence, when the number sequence corresponding to the transformation pattern is input as the key to the key input means 102.

In accordance with another embodiment of the present invention, an encryption function device 110 comprises the aforesaid transformation pattern generating device 101, an input means 105 for inputting data and key and a transformation section 106 for transforming the data in accordance with a transformation pattern generated by the transformation pattern generating means 101 by using the input key as a seed.

The transformation pattern generating devices 101 shown in FIG. 1 is preferably characterized in that, when the number sequence input as the key corresponds to a permutation pattern for permuting a bit sequence of a data on a bit-by-bit basis, the transformation pattern generating means 103 generates the permutation pattern corresponding to the number sequence, defining permutation bit positions for the respective bits of the input data.

Further, the transformation pattern generating means 101 is preferably characterized in that, the number sequence input to the key input section 102 is represented by an n-digit number, and the transformation pattern generating means 103 generates a permutation pattern indicative of a permutational relationship between input n-bit data and postpermutation data so that a numeral Si at the i-th digit (i=1 to n) of the number sequence indicates a bit position of the post-permutation data to which the i-th bit of the input n-bit data is to be permuted.

In accordance with still another embodiment of the present invention, an encryption function device 110 comprises the aforesaid transformation pattern generating device 101, an input means 105 for inputting a key and data of plural bits and a permutation means 107 for permuting a bit sequence of the input data of plural bits on a bit-by-bit basis. The permutation means 107 permutes a bit sequence of the input data in accordance with a permutation pattern generated by the transformation pattern generating mechanism 101 by using the input key as a seed.

In accordance with yet another embodiment of the present invention, the transformation pattern generating device 101 is characterized in that, when the number sequence input as the key corresponds to a substitution table for substituting a predetermined value for a value of the input data, the transformation pattern generating means 103 generates the substitution table corresponding to the number sequence, defining a substitution value for each value of the data.

In accordance with still another embodiment of the present invention, the transformation pattern generating device 101 is characterized in that, when the number sequence input to the input means is represented by an n-digit number and the data input has a value i (i=1 to n), the transformation pattern generating means 103 generates a substitution table indicative of a substitutional relationship between the input data and post-substitution data so that the input data i is to be substituted by a numeral Si at the i-th digit of the number sequence.

In accordance with yet another embodiment of the present invention, an encryption function device 110 comprises the aforesaid transformation pattern generating mechanism 101, an input means 105 for inputting a key and data of plural bits, and a substitution means 108 for transforming the input data of plural bits into a predetermined value. The substitution means 108 substitutes the value of the input data in accordance with a substitution table generated by the transformation pattern generating device 101 by using the input key as a seed.

Figure 2:
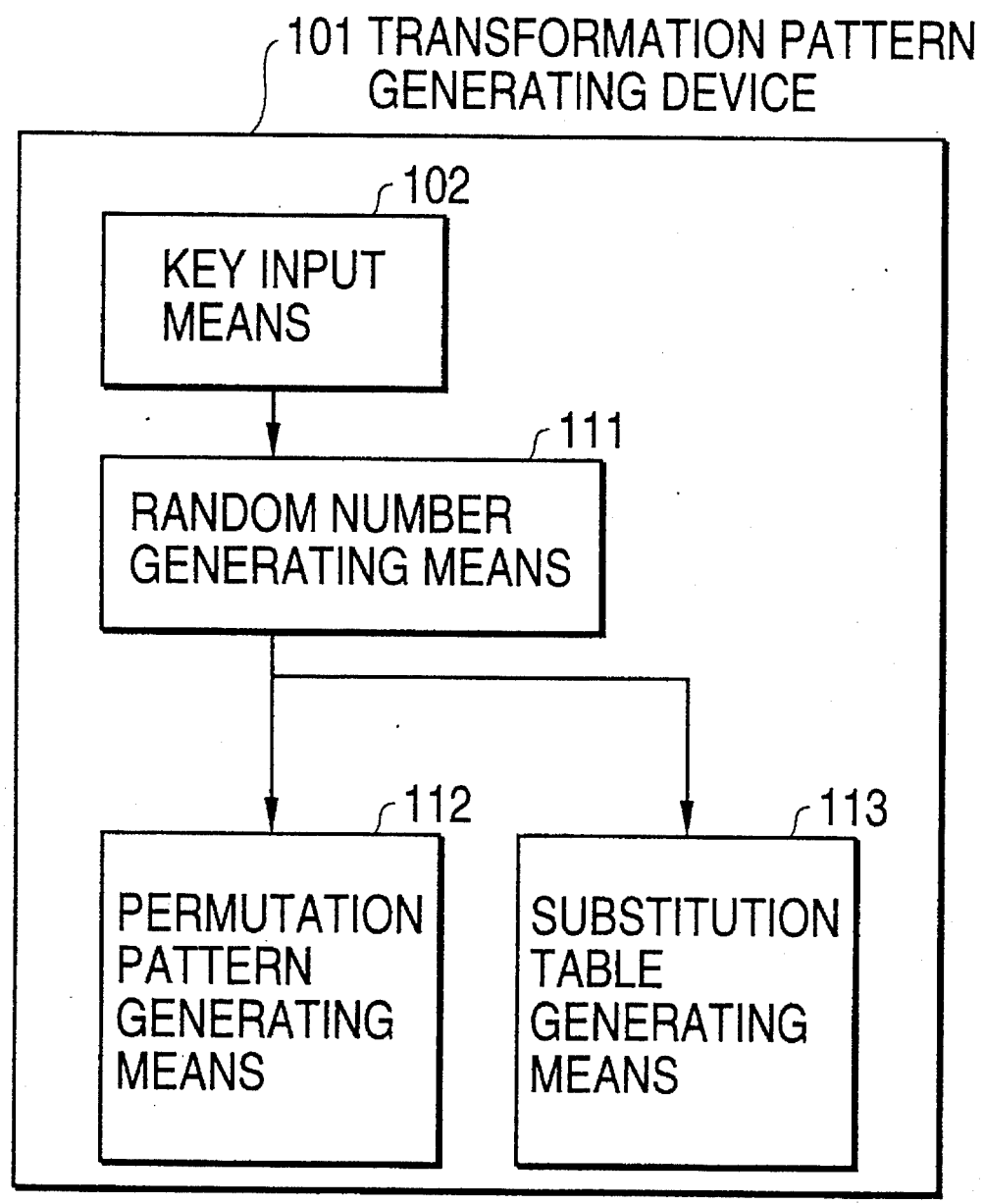
FIG. 2 is a block diagram illustrating the fundamental construction of a transformation pattern generating device in accordance with the present invention.

In accordance with still another embodiment of the present invention, the transformation pattern generating device 101 as shown in FIG. 2 comprises a key input means 102 for inputting a key for encryption, a random number generating means 111 for generating a pseudo-random number sequence including a plurality of random numbers by using the input key as a seed, and a permutation pattern generating means 112 for generating a permutation pattern to be used for the permutation of a bit sequence of the input data in accordance with the pseudo-random number sequence. The permutation pattern generating means 112 generates a permutation pattern corresponding to each of the random numbers of the pseudo-random number sequence.

In accordance with yet another embodiment of the present invention, a cryptographic system comprises the aforesaid transformation pattern generating device 101, an input means 105 for inputting a key and data of plural bits, and a plurality of encryption function devices 110 each including a permutation means for permuting a bit sequence of the input data of plural bits on a bit-by-bit basis. Permutation patterns generated by the transformation pattern generating device 101 are respectively provided to the encryption function devices 110, and the permutation means of each of the encryption function devices 110 permutes the bit sequence of the input data in accordance with the provided permutation pattern.

In accordance with still another embodiment of the present invention, a transformation pattern generating device 101 as shown in FIG. 2 comprises a key input means 102 for inputting a key for encryption, a random number generating means 111 for generating a pseudo-random number sequence including a plurality of random numbers by using the input key as a seed, and a substitution table generating means 113 for generating a substitution table to be used as a reference to transform input data in accordance with the pseudo-random number sequence. The substitution table generating means 113 generates a substitution table corresponding to each of the random numbers of the pseudorandom number sequence.

Figure 3:
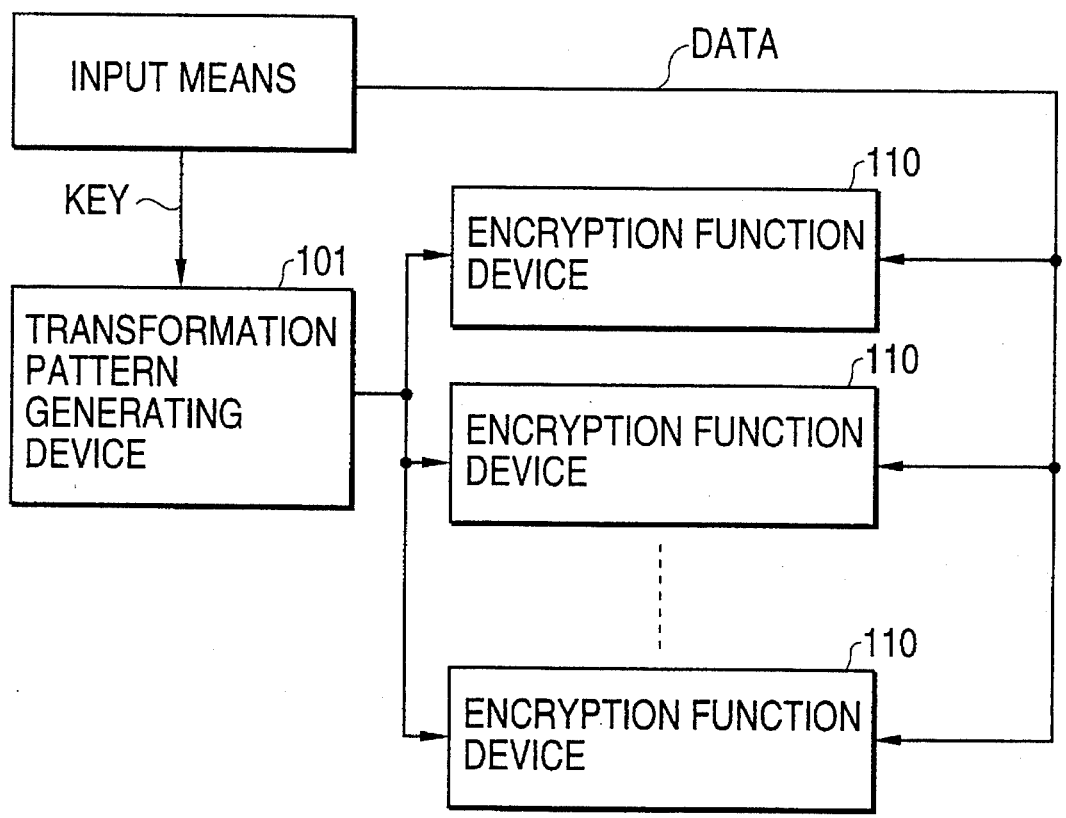
FIG. 3 is a block diagram illustrating the fundamental construction of an encryption system in accordance with the present invention.

In accordance with yet another embodiment of the present invention, a cryptographic system as shown in FIG. 3 comprises the aforesaid transformation pattern generating mechanism 101, an input means 105 for inputting data and key, and a plurality of encryption function devices 110 each including a substitution section for transforming a value of the input data. Substitution tables generated by the transformation pattern generating device 101 are respectively provided to the encryption function devices 110, and the substitution means of each of the encryption function devices 110 substitutes the input data in accordance with the provided substitution table.

With reference to FIGS. 1 to 3, the respective components will be outlined below.

The key input means 102 is a means to which a key can input as a seed for the encryption process of input data. Though the key can be input through a direct key operation by a user, it is more preferable to input the key by reading such a storage medium as an IC card or flexible disk in which the key is stored. In addition, although a key input means for inputting a key and data of plural bits is explained as the input means 105, the key input means 102 and 105 are practically composed as the same component.

In accordance with the present invention, the key thus input is treated as a number sequence assigned to a transformation rule to be applied to the input data, and a transformation pattern is generated based on the number sequence preliminarily assigned thereto.

The transformation pattern generating device 103 generates the transformation pattern for the input data based on the input key.

The transformation pattern is generated in accordance with a predetermined rule (e.g., permutation or substitution table), and it is necessary to predetermine which rule is to be used. The generation of the transformation pattern is preferably controlled by a hardware logic having combinational logic circuits or by a microprocessor having a CPU and control program.

The output means 104 outputs the transformation pattern (i.e., the transformation rule for the input data) generated by the transformation generating means 103 as a table data or as transformation control software, for example, to the transformation means 106, permutation means 107 or substitution means 108 of the encryption function device 110 which will be described later.

Examples of the transformation rule for the input data include permutation for permuting a bit sequence of the input data on a bit-by-bit basis and substitution for transforming the value of the input data into a predetermined value, but not limited thereto. Any other transformation rule can alternatively be employed.

Examples of the permutation include a balanced permutation in which post-permutation data has the same bit number as input data and an expansion permutation in which post-permutation data has a larger bit number than input data.

The transformation means 106 is preferably controlled by a hardware logic or by a microprocessor having a CPU and control program. The transformation means 106 transforms the data for encryption based on the transformation pattern generated by the transformation pattern generating device 101.

More specifically, the transformation means 106 means the permutation means 107 and/or substitution means 108 for performing such a transforming operation as permutation or substitution.

The random number generating means 111 employs such known processes as of DES, FEAL and M-series (not limited thereto) to generate a pseudo-random number sequence.

The permutation pattern generating means 112 and substitution table generating means 113 generate a permutation pattern and substitution table, respectively, in accordance with a predetermined process by using the pseudo-random number sequence as an input, and are preferably controlled by a hardware logic or by a CPU and control software.

Specifically, an encryption function device of a cryptographic system of the present invention comprises: m (even number) input switches (SF1 to SFm); m output destination switches (SR1 to SRm); m substitution tables (M1 to Mm); m exclusive-OR circuits (EOR1 to EORm); a permutation circuit (VT) having m input terminals and m output terminals; and a bit rotate shift means (ROT) having m input terminals and m output terminals; wherein the j-th (j=1 to m) input switch (SFj) in one switching state outputs the j-th mini-block which is one of m mini-blocks which input data divided into, and the j-th input switch (SFj) in another switching state outputs a mini-block sent from the j-th output destination switch (SRj); wherein the j-th output destination switch (SRj) in one switching state outputs the j-th mini-block in the bit rotate shift means (ROT) to outside, and the j-th output destination switch (SRj) in another switching state outputs the j-th mini-block in the bit rotate shift means (ROT) to the j-th input switch (SFj); wherein the output of the k-th (k=1 to i−1 and i−1=m/2) input switch (SFk) is input to an address of the k-th substitution table (Mk); wherein the output of the k-th substitution table (Mk) and the output of the (i+k−1)-th substitution table (Mi+k−1) are input to the k-th exclusive-OR circuit (EORk); wherein the output of the (i+k−1)-th exclusive-OR circuit (EORi+k−1) is input to an address of the (i+k−1)-th substitution table (Mi+k−1); wherein the output of the (i+k−1)-th input switch (SFi+k−1) and the output of the k-th substitution table (Mk) are input to the (i+k−1)-th exclusive-OR circuit (EORi+k−1); wherein the output of the k-th exclusiveOR circuit (EORk) is input to the k-th input terminal of the permutation circuit (VT); wherein the output of the (i+k−1)-th substitution table (Mi+k−1) is applied to the (i+k−1)-th input terminal of the permutation circuit (VT); wherein the j-th output of the permutation circuit (VT) is input to the j-th input terminal of the bit rotation shift means (ROT); wherein the bit rotate shift means (ROT) rotatively shifts the entire data input to the first to m-th input terminals thereof.

The encryption function device of the cryptographic system of the present invention is characterized in that the contents of the m substitution tables (M1 to Mm) are changed in accordance with key data input to the encryption function mechanism.

The encryption function device of the cryptographic system of the present invention is further characterized in that the permutation mode of the permutation circuit (VT) is changed in accordance with key data input to the encryption function device.

The encryption function device of the cryptographic system of the present invention is still further characterized in that the shift amount of the bit rotation shift means (ROT) is changed in accordance with key data input to the encryption function device.

The encryption function device of the cryptographic system of the present invention is yet further characterized in that the number of times of feeding back data from the m output destination switches (SR1 to SRm) to the m input switches (SF1 to SFm) is changed in accordance with key data input to the encryption function device.

Figure 15:
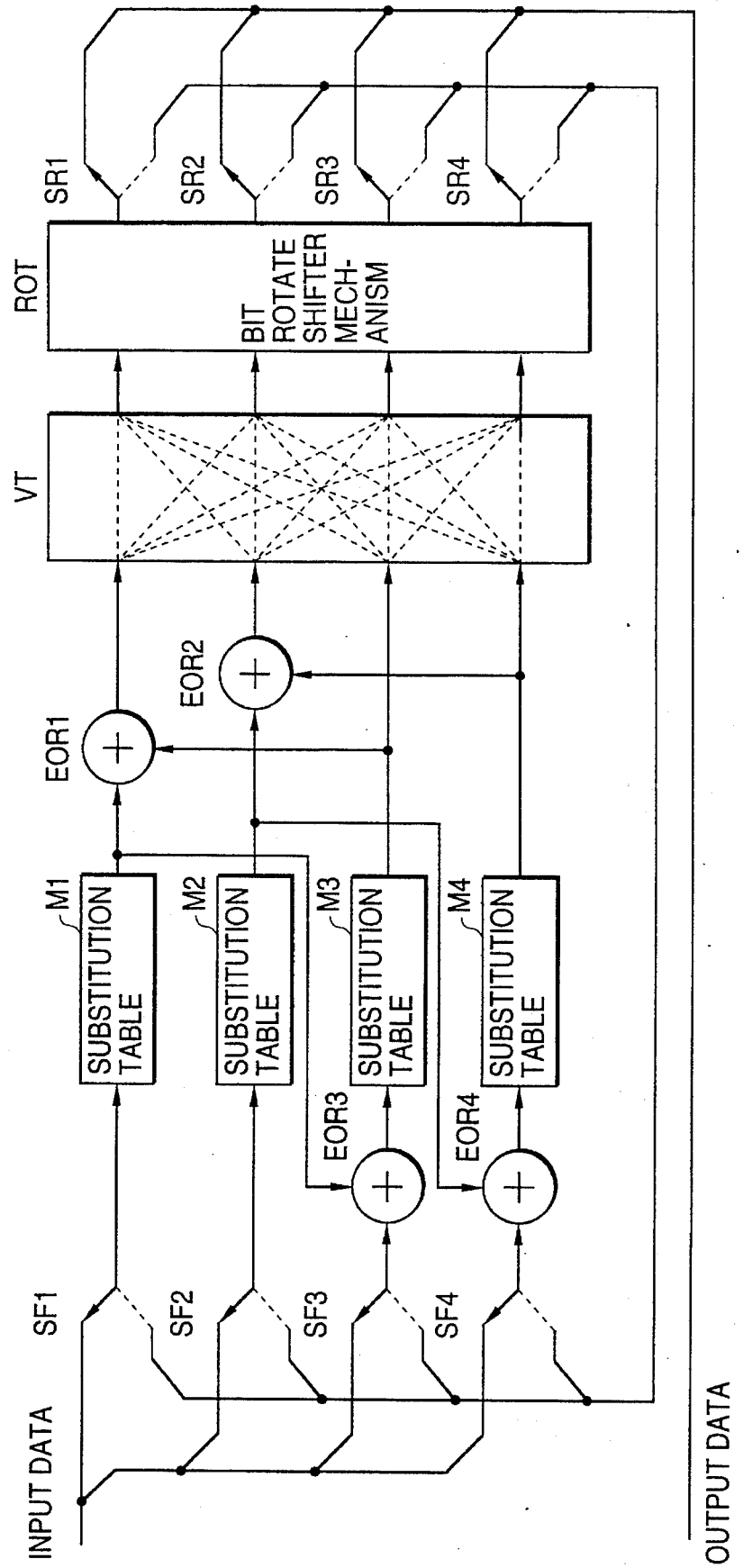
FIG. 15 is a diagram for explaining the principle of an encryption function device in accordance with the present invention.

FIG. 15 is a diagram for explaining the principle of the encryption function device of the present invention.

In FIG. 15, it is assumed that the number m is set to m=4 for simplicity. In the initial state, the input switches SF1 to SF4 are in a switching state indicated by solid lines, the output destination switches SR1 to SR4 are in a switching state indicated by dotted lines, and the outputs of the respective unit substitution tables M1 to M4 are all zero. Input data of 16 bits is divided into four, so that four 4-bit mini-blocks are generated.

The first mini-block of the input data is input to an address of the substitution table M1, and the second mini-block of the input data is input to an address of the substitution table M2. Since the output of the substitution table M1 is zero at this stage, the third mini-block of the input data is directly input to an address of the substitution table M3. Similarly, since the output of the substitution table M2 is zero at this stage, the fourth mini-block of the input data is directly input to the addresses of the substitution table M4.

When the first read-out instruction is issued to the substitution tables M1 to M4, the 4-bit data are read out of the respective substitution tables M1 to M4. The data read out of the substitution table M1 is exclusive-ORed with the data read out of the substitution table M3 in the exclusive-OR circuit EOR1, and the EOR output is input to the first input terminal of the permutation circuit VT. Similarly, the data read out of the substitution table M2 is exclusive-ORed with the data read out of the substitution table M4 in the exclusive circuit EOR2, and the EOR output is input to the second input terminal of the permutation circuit VT. The data out of the substitution tables M3 and M4 are also input directly to the third and fourth input terminals, respectively, of the permutation circuit VT. After the first data read-out, the input switches SF1 to SF4 are switched to a switching state indicated by dotted lines.

The output of the permutation circuit VT is input to the bit rotate shift means ROT. When the first rotate shift instruction is issued, the bit rotate shift means ROT rotatively shifts the input data by a shift amount designated by the rotate shift instruction. The 4-bit data output from the first output terminal of the bit rotate shift means ROT is output from the first input switch SF1. Similarly, the 4-bit data output from the second, third and fourth output terminals of the bit rotate shift means ROT are output from the second, third and fourth input switches SF2, SF3 and SF4, respectively.

At this time, the data from the input switch SF1 is directly input to an address of the substitution table M1, and the data from the input switch S2 is directly input to an address of the substitution table M2. The data from the input switch SF3 is exclusive-ORed with the output of the substitution table M1 (the first read-out data) in the exclusive-OR circuit EOR3. The EOR output is input to an address of the substitution table M3. The data from the input switch SF4 is exclusive-ORed with the output of the substitution table M2 (the first read-out data) in the exclusive-OR circuit EOR4. The EOR output is input to an address of the substitution table M4.

When the second read-out instruction is issued to the substitution tables M1 to M4, new data is input to the respective input terminals of the permutation circuit VT, and the new data is output from the respective output terminals of the permutation circuit VT to the bit rotate shift means ROT. When the second rotate shift instruction is issued to the bit rotate shift means ROT, the new data is output from the respective output terminals of the bit rotate shift means ROT, and then fed back to the input side.

After the processing sequence from the operation of reading the data out of the substitution tables M1 to M4 to the operation of rotatively shifting the data by means of the bit rotation shift mechanism ROT is repeated designated times, the output destination switches SR1 to SR4 are switched to a switching state indicated by dotted lines.

The present invention will hereinafter be detailed by way of EMBODIMENTs 1 to 6 with reference to the attached drawings.

It should be understood that the present invention is not limited to the specifics described in these EMBODIMENTs.

Figure 4:
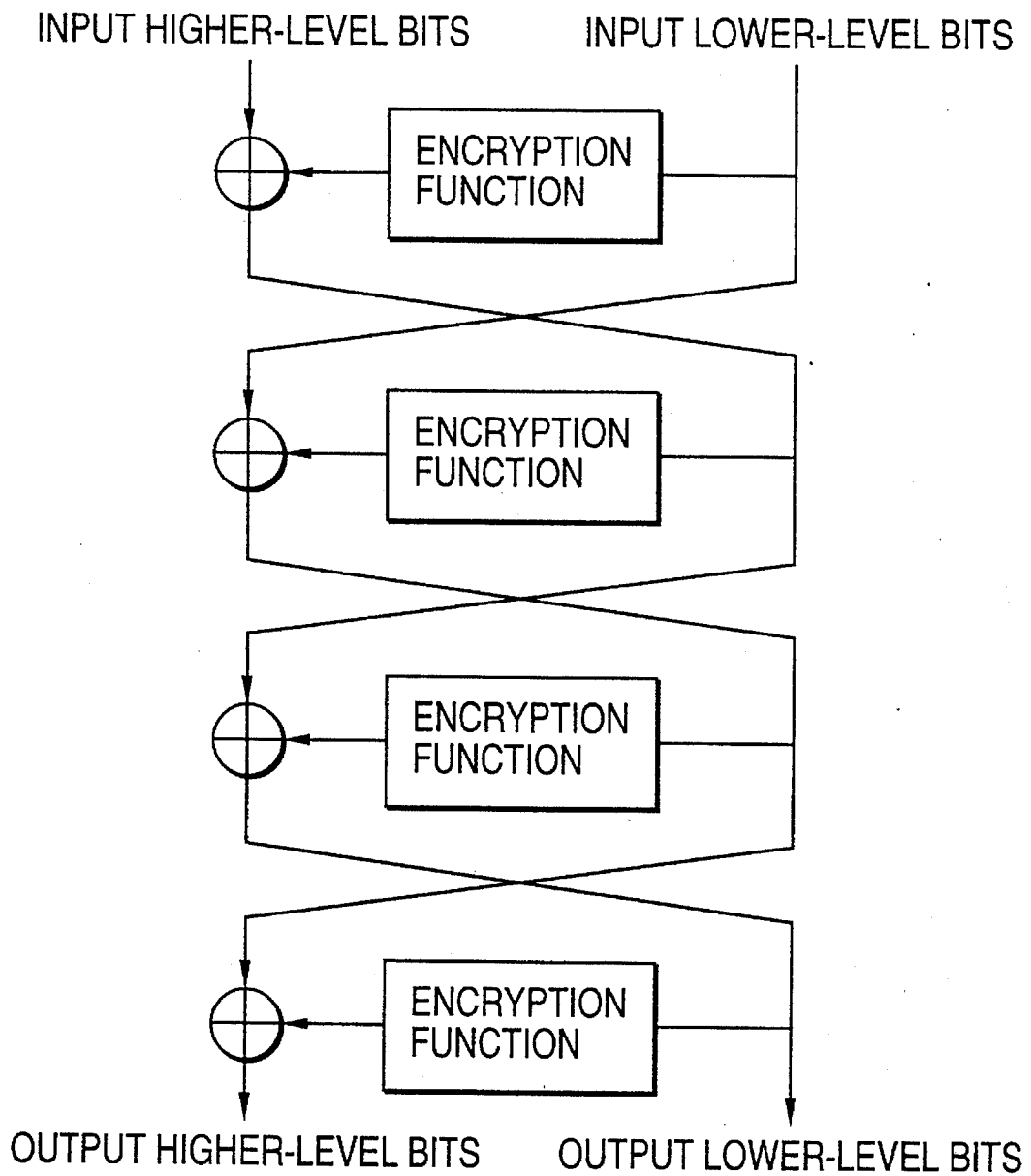
FIG. 4 is a block diagram illustrating the structure of an involution type cryptosystem.

An involution-type cryptosystem employing a four-round encryption mechanism will first be described with reference to FIG. 4, which illustrates the construction thereof.

It is assumed that the size of data to be enciphered is 64 bits and 64-bit ciphertext is output.

The input data is divided into higher-level 32 bits and lower-level 32 bits. Then, the lower-level 32 bits are randomized through an encryption function by using different keys in respective rounds, and exclusive-ORed with the input higher-level 32 bits on a bit-by-bit basis. Further, the resultant exclusive-ORed data is input as lower-level 32-bit data, and the original lower-level 32-bit data is input as higher-level 32-bit data in the next round. This process is iterated four times. In the final round, the higher-level 32-bit data and lower-level 32-bit data are not exchanged.

The following EMBODIMENTs relate to the internal construction of an encryption function for the involution-type cryptosystem of the aforesaid structure.

EMBODIMENT 1

Figures 5, 6:
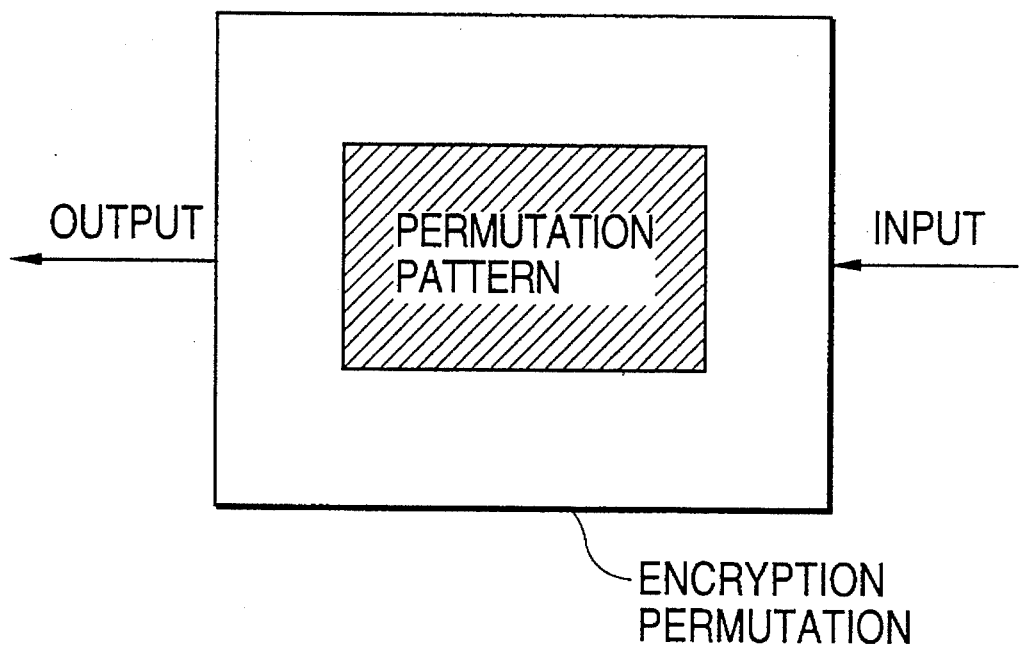
FIG. 5 is a block diagram illustrating the structure of an encryption function in accordance with EMBODIMENT 1 of the present invention.
FIG. 6 is a diagram for explaining an exemplary permutation pattern.

In FIG. 5, there is shown the structure of an encryption function in accordance with EMBODIMENT 1 of the present invention. This encryption function includes only permutation for 8-bit data input and output. A permutation pattern is expressed, for example, as a number sequence shown in FIG. 6. In FIG. 6, a numeral "1" in the leftmost bit position of the permutation pattern means that a bit in a bit position 0 of input data is to be output as a bit in a bit position 1 of output data, and a numeral "4" in the next bit position means that a bit in a bit position 1 of the input data is to be output as a bit in a bit position 4 of the output data. Similarly, bits in bit positions 2, 3, 4, 5, 6 and 7 of the input data are to be output as bits in bit positions 7, 6, 2, 3, 5 and 0, respectively, of the output data.

It is assumed that a digit string of "14762350" read from left to right of the permutation pattern shown in FIG. 6 is a number sequence assigned to this permutation pattern.

Since number sequences are assigned to respective permutation patterns in one-to-one correspondence, any permutation pattern for the 8-bit input and output data can be unitarily determined by the corresponding number sequence. That is, different permutation patterns can be employed for the permutation by inputting different number sequences.

The permutation pattern is not a predetermined fixed one, but can be variably set as required, and hence it is very difficult to count the number of probable differential outputs for a particular differential input.

For example, the permutation for 4-bit input and output has 16! (16 factorial) permutation patterns. Therefore, if all the permutation patterns are to be selected with an equal probability, it is virtually impossible to count the number of probable differential outputs for the permutation of 4-bit input and output.

Next, a case where the encryption function thus prepared is applied to the aforesaid involution-type cryptosystem will be described. It is assumed that the encryption function includes only the permutation pattern shown in FIG. 6.

If the bit pattern input to the encryption function is "10101010"", i.e., bits in bit positions 0, 1, 2, 3, 4, 5, 6 and 7 of the input bit pattern are 1, 0, 1, 0, 1, 0, 1 and 0, respectively, the output bit pattern is "01100101", i.e., bits in bit positions 1, 4, 7, 6, 2, 3, 5 and 0 of the output data are 1, 0, 1, 0, 1, 0, 1 and 0, respectively.

Thus, a cryptosystem invulnerable to differential attack can be realized by employing the randomization of the input data.

In this explanation, an example of 8-bit data has been employed, but not limited thereto. For example, 32-bit or 64-bit data may otherwise be employed for the permutation of any scale. Further, though the aforesaid encryption function utilizes only permutation, a substitution table and reverse permutation may be utilized in combination with the permutation.

EMBODIMENT 2

In FIG. 7, there is shown the structure of an encryption function in accordance with EMBODIMENT 2 of the present invention. This encryption function includes only a substitution table for 4-bit data input and output. Though the explanation will be given only to an example for 4-bit data, this substitution table can be applied to input data of any bit size.

The substitution table is represented in a form as shown in FIG. 8. There are 16 hexadecimal numbers in the substitution table shown in FIG. 8, where addresses are assigned to respective positions from the left upper position to the right lower position, i.e., addresses 0 to 3 in the first line, addresses 4 to 7 in the second line, addresses 8 to 12 in the third line and addresses 13 to 15 in the fourth line.

The address is assumed to correspond to the value of an input bit pattern, and the number filled in each address in the substitution table is assumed to correspond to the value of an output bit pattern represented in hexadecimal. For example, if an input bit pattern is "0000" in binary, i.e., "0" in hexadecimal, an output bit pattern is "1000" in binary, i.e., "8" in hexadecimal.

A numeral "4" filled in the address 8 in the third line means that, if the input bit pattern is "8" in hexadecimal (i.e., "1000" in binary), the output bit pattern is "4" in hexadecimal (i.e., "0100" in binary).

Each substitution table is assigned a number sequence in substantially the same manner as described in EMBODIMENT 1. That is, a digit sequence of "813FA6C5490EB27D" read from the left upper position to the right lower position is a number sequence assigned to this substitution table.

Since number sequences are thus assigned to respective substitution tables in one-to-one correspondence, any substitution table for the 4-bit data input and output can be unitarily determined by the corresponding number sequence.

Therefore, the substitution table variably changed as required makes it virtually impossible to count the number of all the probable differential outputs, similarly to EMBODIMENT 1.

Next, a case where the encryption function thus prepared is applied to the aforesaid involution-type cryptosystem will be described.

It is assumed that the encryption function includes only the substitution table shown in FIG. 8.

If the bit pattern input to the encryption function is "0000" which means the address 0 of the substitution table shown in FIG. 8, the output bit pattern is "1000" (i.e., "8" in hexadecimal which is a value filled in the address 0). Thus, a cryptosystem invulnerable to differential attack can be realized by employing the randomization of the input data.

EMBODIMENT 3

Figure 13:
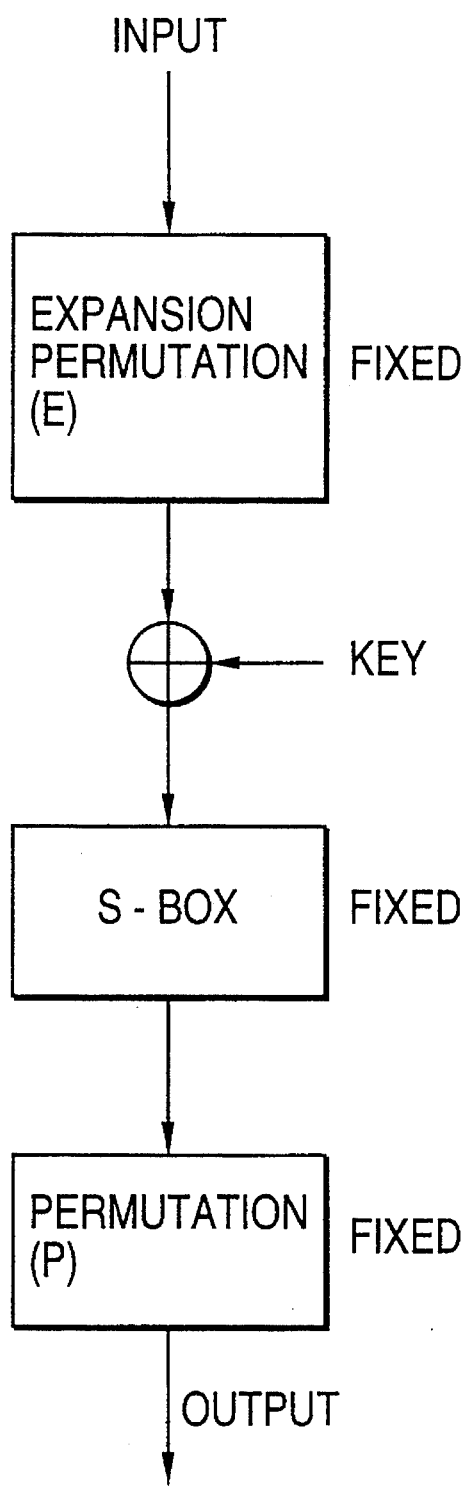
FIG. 13 is a model of an exemplary process performed in an encryption function of the conventional DES cryptosystem.

With reference to FIG. 13, an exemplary DES encryption function will hereinafter be described which employs the permutation pattern and substitution table respectively assigned number sequences as shown in EMBODIMENTs 1 and 2.

Without changing the internal structure of the encryption function, any of the expansion permutation pattern (E), substitution table (S-Box) and permutation pattern (P) to be utilized in respective rounds of the DES encryption function shown in FIG. 13 can be determined by inputting one or more number sequences.

In addition to a key employed for the conventional DES cryptosystem, the number sequence for designating the substitution table or permutation pattern (E, P or S-Box) is input as a new key.

Though the processing operations E, S-Box and P performed inside the encryption function are predetermined and fixed operations in accordance with the conventional DES cryptosystem, these processing operations can be easily modified by way of externally provided keys in accordance with this embodiment of the present invention. Therefore, a cryptosystem invulnerable to differential attack can be realized.

EMBODIMENT 4

In accordance with this embodiment of the present invention, the permutation pattern and/or substitution table are not designated by a number sequence input as a key, unlike EMBODIMENT 3. Instead, the permutation pattern and/or substitution table to be utilized are determined by a pseudo-random number sequence generated by a random number generator to which a predetermined key is input.

The permutation pattern and/or substitution table thus determined are employed as an encryption function used in each round of the involution-type cryptosystem.

A permutation pattern and/or substitution table determined in accordance with the following process may be assigned number sequences so as to be applied to the aforesaid EMBODIMENTs 1 to 3.

Figure 9:
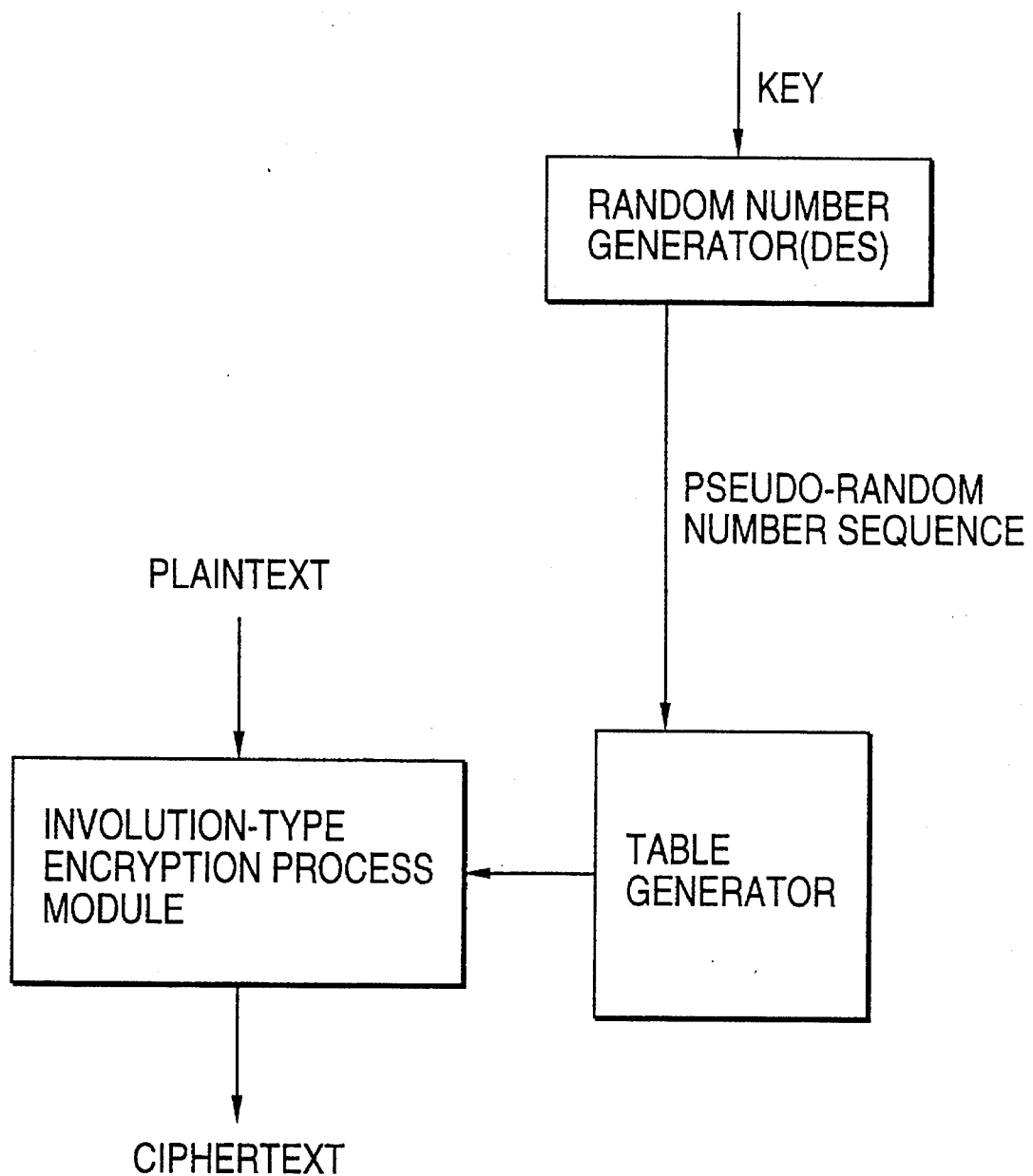
FIG. 9 is a block diagram illustrating an arrangement for determining a substitution table in accordance with EMBODIMENT 4.

FIG. 9 is a block diagram illustrating an arrangement for determining a permutation pattern or substitution table to be utilized in an involution-type encryption process module. The involution-type encryption process module is equivalent to the DES encryption function shown in FIG. 13.

First, a predetermined fixed key is input to a random number generator as a seed for random number generation. An exemplary random number generator is a DES random number generator which is operable in a known CBC mode.

A table generator generates a permutation pattern and substitution table by using a pseudo-random number sequence obtained by the random number generator. A process for table generation will be described later.

Tables generated by means of the table generator are applied to encryption functions utilized in respective rounds of the involution-type encryption process module. A number sequence, for example, may be input to the encryption process module to designate the corresponding table, as described in EMBODIMENT 1.

An exemplary process for generating a 4-bit substitution table will be described below. First, a number sequence K="039649c539313965", for example, is input as a fixed key to the random number generator (DES). Then, a CPU time from system startup r0="1000000000000000", for example, is input as a seed for random number generation. At this time, a first random number r1="2c976076a7058d44" is obtained by encrypting r0 with the key K.

Further, a second random number r2 is obtained by encrypting r1 with the key K. More generally, an n-th random number rn is obtained by encrypting rn−1 with the key K.

It is assumed that each digit in the random number is expressed in 4-bit form, i.e., the first digit "2" of r1 is expressed as "0010" in 4-bit form. By using the pseudo-random number sequence r1, r2, . . . and rn thus obtained, the table generator generates a substitution table.

Figure 10:
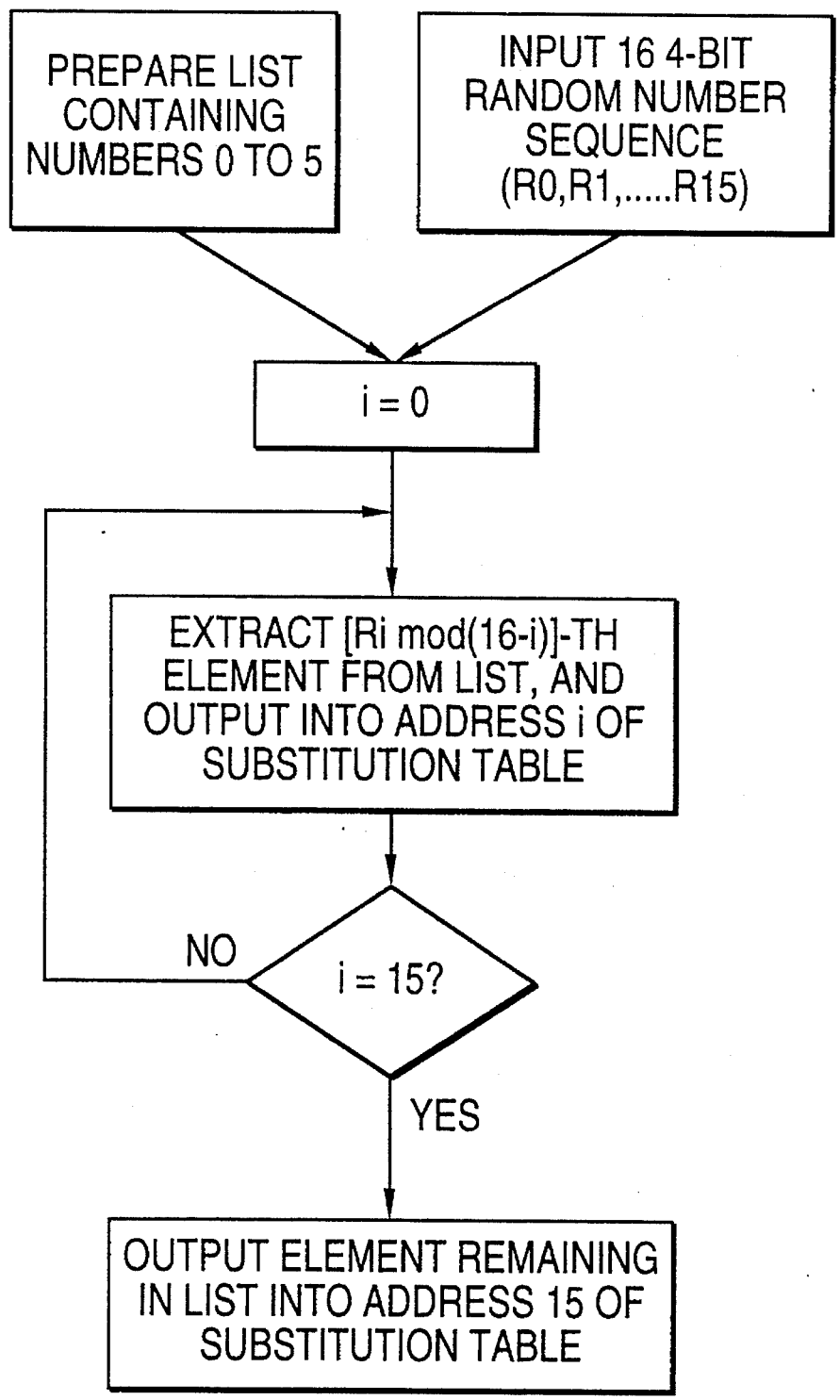
FIG. 10 is a flow chart illustrating a process for generating a 4-bit substitution table.

In FIG. 10, there is shown a process flow for generating a 4-bit substitution table. An element list containing 16 numbers 0 to 15 is prepared. These number elements 0, 1, 2, . . . and 15 are aligned in this order. That is, the first element is "0", the second element is "1", and the 16th element is "15".

A random number ri consisting of 16 digits is divided into 16 4-bit random number sequences (R0, R1, . . . and R15) in such a manner that the first bit of the random number ri is set to R0 (="2"), the next bit is set to R1 (="c"), and so forth.

The initial value is set to i=0, and elements to be assigned to all the 16 addresses of a 4-bit substitution table are determined in accordance with the following process for each of the random numbers ri (i=0 to 15).

First, [Ri mod(16−i)] is calculated. Then, an element in the [Ri mod(16−i)]-th position is extracted from the list consisting of 16 numbers, and is output to the i-th address of the substitution table. For example, if r1(i=1) is used, R0="2", and then [R0 mod 15]=2. Therefore, an element to be assigned to the address 0 of the substitution table is "1", which is the second element of the list.

Similarly, the second digit is R1="c" (="12" in decimal), and then [R1 mod 14]=12. Therefore, an element to be assigned to the address 1 of the substitution table is "13", which is the 12th element of the list.

By repeating this process, the elements are assigned to all the addresses 0 to 15 of the substitution table, and thus the 4-bit substitution table is completed. In case that a plurality of substitution tables are generated, one substitution table is first generated from the random number ri in accordance with the aforesaid process, and then another substitution table is generated from the next random number ri+1.

Though the generation of a substitution table is shown in this embodiment, a permutation pattern can also be generated in substantially the same manner.

In accordance with this embodiment, substitution tables and permutation patterns respectively utilized for the encryption functions of plural rounds can be all determined by inputting a given fixed key as a seed and generating a pseudo-random number. Therefore, it is not necessary to increase the bit length of the key in order to determine a plurality of substitution tables and permutation patterns, thereby reducing a storage area for storing the key. Though this embodiment employs the DES random number generator for the generation of pseudo-random number sequence, such random number generators as of FEAL and M-series can also be employed.

EMBODIMENT 5

By employing the permutation patterns and substitution tables described in EMBODIMENTs 1 to 4 in combination, cryptosystems more invulnerable to differential attack can be constructed, thereby increasing the security of cryptography.

Figure 11:
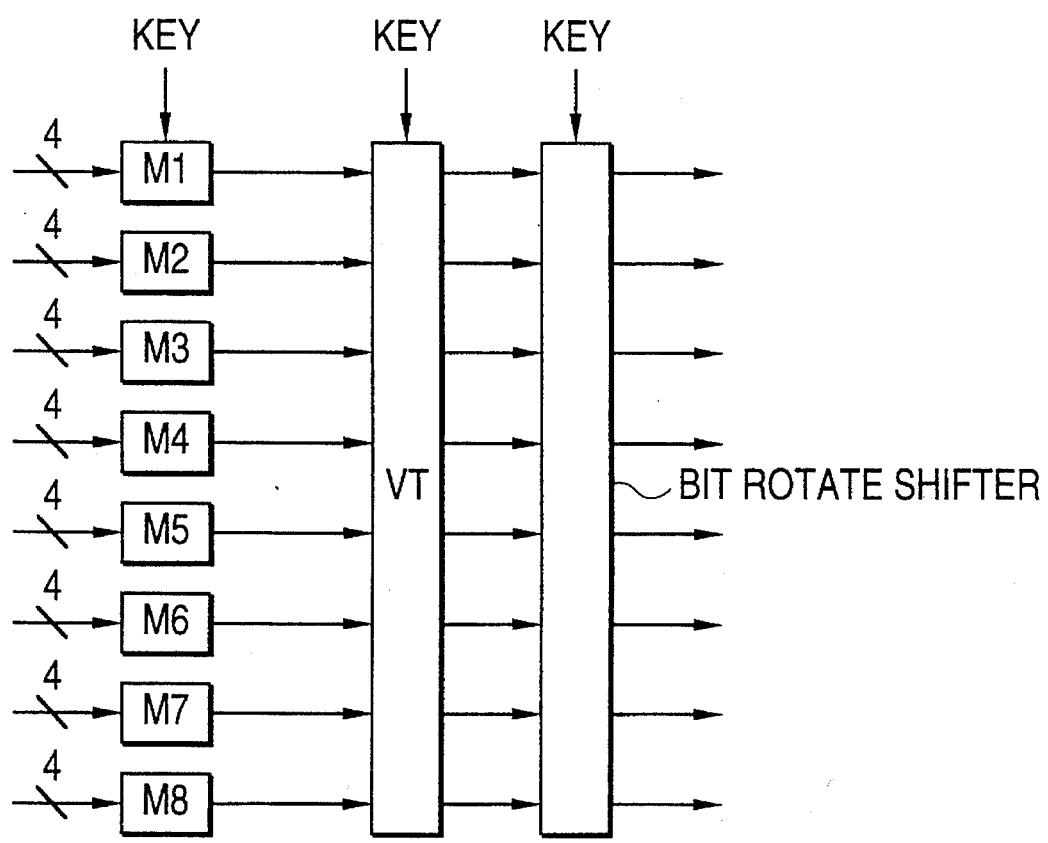
FIG. 11 is a diagram for explaining an exemplary encryption function in accordance with EMBODIMENT 5.
Figure 12:
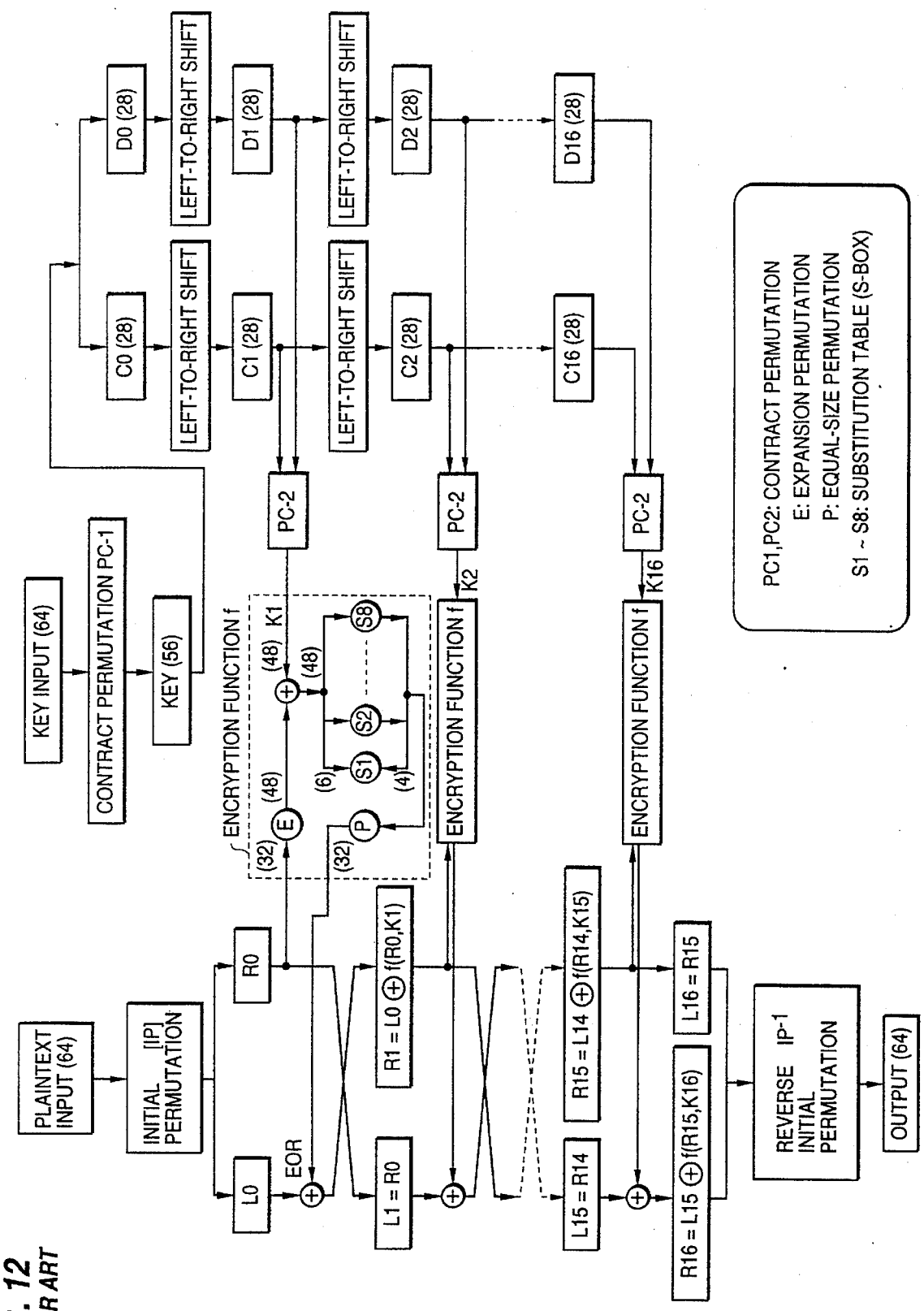
FIG. 12 is a diagram for explaining a conventional DES cryptosystem.

In FIG. 11, there is shown an exemplary encryption function employing a permutation pattern and substitution table in combination. The size of input data is 32 bits. In FIG. 11, Mi (i=1 to 8) denotes substitution tables for 4-bit data input and output, and VT denotes a 4-bit block permutation pattern. The substitution tables can be each determined by inputting the aforesaid number sequence as a key. A bit rotate shifter serves to rotatively shift the input data.

EMBODIMENT 6

Figure 16:
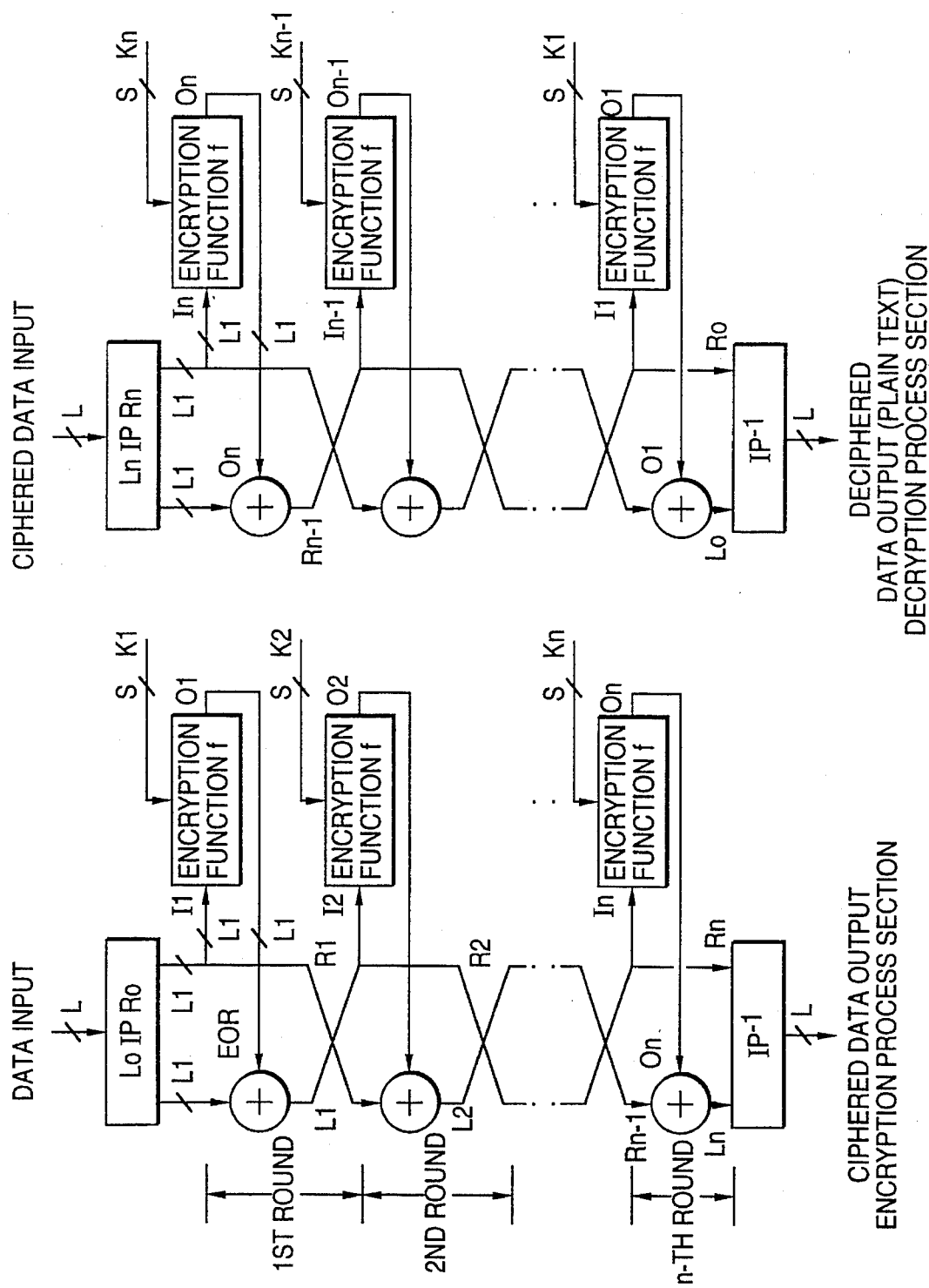
FIG. 16 is a diagram illustrating the fundamental construction of a cryptographic system.

The construction and operation of an encryption function mechanism in accordance with this embodiment will be detailed below.

in FIG. 16, there is shown the fundamental construction of an involution-type cryptographic system. The left side of FIG. 16 shows an encryption process section. In the encryption process section, input block data is permuted, and then output data is divided into two halves. The right half of the output data is input to an encryption function f. The left half of the output data is exclusive-ORed with the output of the encryption function. The right half sub-block is swapped with the exclusive-ORed output, that is, the right half block is shifted to the left and the exclusive-ORed output is shifted to the right. This process is iterated a plurality of times, and then the right and left half block data are reversely permuted. Thus, ciphered data is finally obtained.

The right side of FIG. 16 shows a decryption process section. The decryption process section has substantially the same construction as the encryption process section. Provided that keys utilized in the first, second, . . . and n-th rounds in the encryption process section are K1, K2, . . . and Kn, respectively, keys utilized in the first, second, . . . and n-th rounds in the decryption process section are Kn, Kn–1, . . . and K1, respectively.

An encryption function of the j-th round of the decryption process employs a reverse substitution table for performing a substitution reverse to that performed with a substitution table of an encryption function of the (n–j+1)-th round of the encryption process, a reverse permutation pattern for performing a permutation reverse to that performed with a permutation pattern of the encryption function of the (n–j+1)-th round of the encryption process, and a reverse bit rotate shift mechanism for performing a rotate shift reverse to that performed by a bit rotate shift mechanism of the encryption function of the (n–j+1)-th round of the encryption process.

Figure 17:
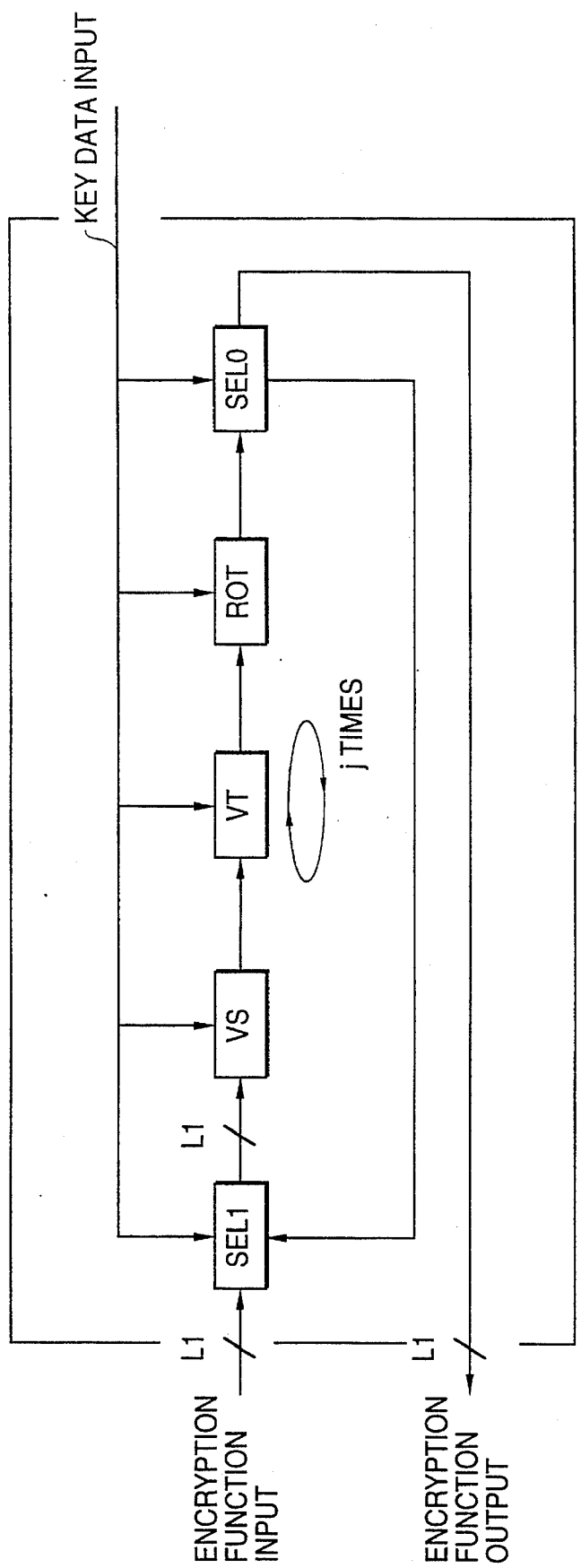
FIG. 17 is a diagram illustrating the block structure of an encryption function f in accordance with the present invention.

FIG. 17 shows the structure of the encryption function f.

In FIG. 17, reference characters SELi, VS, VT, ROT and SELo denote an input selector, variable substitution table, variable permutation circuit, variable bit rotate shifter and output selector, respectively.

The input selector SELi serves to select externally input data and to selectively output data from the output selector SELo, and has a plurality of input switches. The variable substitution table VS includes a plurality of exclusive-OR circuits and a plurality of unit substitution tables. The variable permutation circuit VT serves to perform a permutation. The bit rotate shifter ROT serves to rotatively shift input data. The output selector SELo serves to output input data to outside and to feed the input data back to the input selector SELi, and has a plurality of output destination switches.

The content of the variable substitution table VS, the permutation arrangement of the variable permutation circuit VT, the rotate shift amount of the bit rotate shifter ROT and the number of feed backs from the output side to the input side can be respectively changed by key data.

The sub-block data input to the encryption function section f is input to an address of the variable substitution table VS via the input selector SELi, and then the content of the variable substitution table VS is indexed and output. The output is input to the variable permutation circuit VT, and subjected to a permutation process by a unit of mini-block. The unit outputs of the permuted mini-blocks are integrated into a sub-block, and input to the variable bit rotate shifter ROT. The output of the variable rotate shifter ROT is input to the output selector SELo, and then fed back to the input selector SELi. This process is repeated j times in accordance with the value of the key data to generate an encryption function output, which is output to the exclusiveOR circuit shown in FIG. 16.

The keys input to the input selector SELi, output selector SELo, variable substitution table VS, variable permutation circuit VT and variable bit rotate shifter ROT can be changed, depending on the levels of security requirement. For a lower security level, all the processing operations performed therein are fixed, regardless of the swapping process unit. In case that a higher security level is required, on the other hand, the number of feed backs, the value of the substitution table VS, the permutation arrangement of the variable permutation circuit VT, the initial shift amount of the variable bit rotate shifter ROT are changed for every swapping process. In this case, the value of the variable substitution table VS, the permutation arrangement of the variable permutation circuit VT and the initial value of the variable bit rotate shifter ROT can be changed every feed back.

Figure 18:
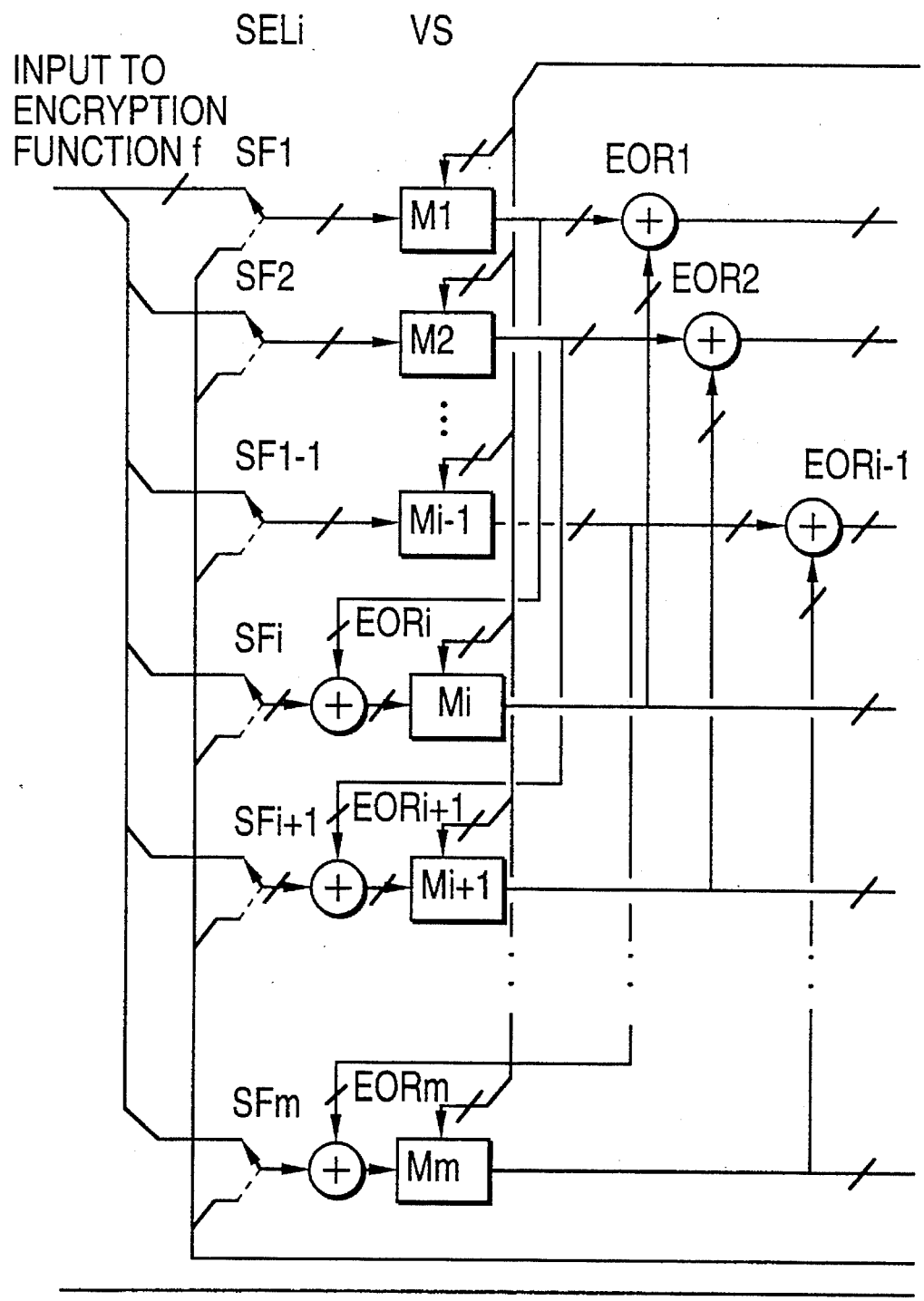
FIG. 18 is a diagram illustrating an encryption function section in accordance with one embodiment of the present invention.
Figure 19:
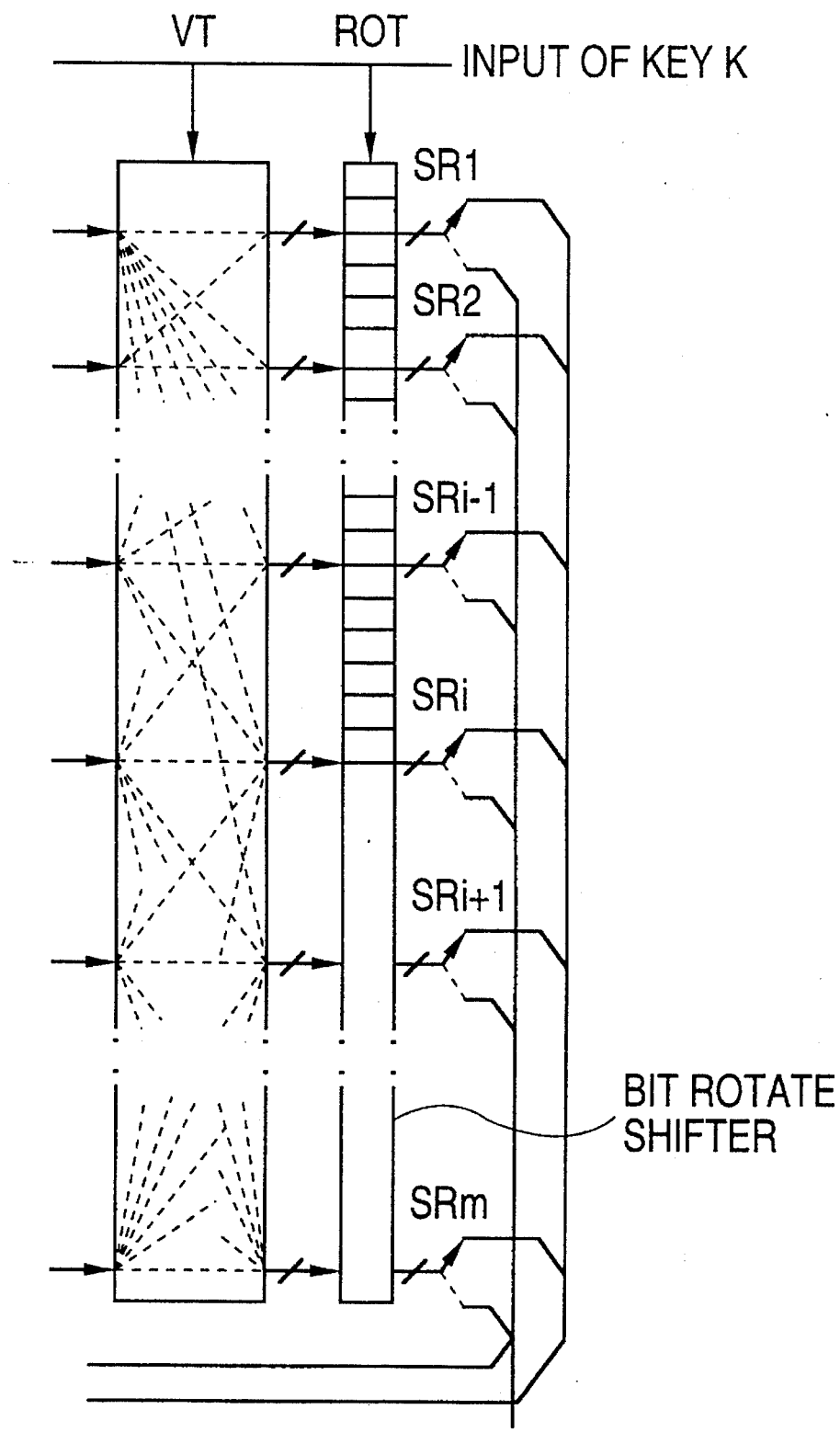
FIG. 19 is the continuation of FIG. 18.

In FIGS. 18 and 19, there is shown an exemplary encryption function section in accordance with the present invention. In FIGS. 18 and 19, reference characters EOR1 to EORm, M1 to Mm, SF1 to SFm and SR1 to SRm denote exclusive-OR circuits, unit substitution tables, input switches and output destination switches, respectively. Like reference characters designate like parts in FIGS. 17, 18 and 19.

The input switches SF1 to SFm are included in the input selector SELi, and the output destination switches SR1 to SRm are included in the output selector SELo. The variable unit substitution tables M1 to Mn and exclusive-OR circuits EOR1 to EORm are included in the variable substitution tables VS. A number m is an even number, and a number i−1 equals m/2.

The data input to the encryption function f is divided into m mini-blocks, and each of m mini-blocks is divided into higher-level group and lower-level group. The k-th (k=1 to i1) mini block belonging to the higher-level group is input to an address of the unit substitution table Mk via the input switch SFk in a switching state indicated by a solid line, and the data corresponding to the value of the input mini-block is read out of the unit substitution table Mk.

The unit substitution table comprises a rewritable storage and serves to perform a balanced substitution. The data read out of the unit substitution table Mk is exclusive-ORed with the data read out of the unit substitution table Mi+k−1, and the resultant data is applied to the k-th input terminal of the variable permutation circuit VT.

The (i+k−1)-th mini-block belonging to the lower-level group is input to the exclusive-OR circuit EORi+k−1 via the input switch SFi+k−1 in a switching state indicated by a solid line, and exclusive-ORed with data read out of the unit substitution table Mk.

The output of the exclusive-OR circuit EORi+k−1 is input to an address of the unit substitution table Mi+k−1, and the data corresponding to the input mini-block is read out of the unit substitution table Mi+k−1. The data output from the unit substitution table Mi+k−1 is applied to the (i+k−1)-th input terminal of the variable permutation circuit VT.

The variable permutation circuit VT leads the data input to the respective input terminals to output terminals which are each determined by the value of the key k. The respective outputs of the variable permutation circuit VT are input to the corresponding input terminals of the variable bit rotate shifter ROT. The bit rotate shifter ROT rotatively shifts the entire data input to the 1st to m-th input terminals thereof in a predetermined direction (for example, to the right) by such a shift amount as determined by the value of the key k.

Data output from the k-th output terminal of the variable bit rotate shifter ROT is input to an address terminal of the unit substitution table Mk via the output destination switch SRk and the input switch SFk which are both in a switching state indicated by dotted lines.

The data output from the (i+k−1)-th output terminal of the variable bit rotate shifter ROT is input to the exclusiveOR circuit EORi+k−1 via the output destination switch SRi+k−1 and the input switch SFi+k−1 which are both in a switching state indicated by dotted lines.

After the processing sequence from the operation of reading data out of the unit substitution tables M1 to Mm to the operation of rotatively shifting data by means of the variable bit rotate shifter ROT is repeated j times which is determined by the value of the key k, the output destination switches SR1 to SRm are switched to the positions indicated by solid lines to output the data from the variable bit rotate shifter ROT to the outside.

The rewriting of the contents of the unit substitution tables M1 to Mm is carried out by a processor. The variable permutation circuit VT has a control register for retaining control data indicating which output terminal the input terminal is connected to, and the rewriting of the control register is also carried out by the processor. The bit rotate shifter ROT has a shift-amount-data retaining register for retaining data indicative of the rotate shift amount, and the rewriting of the shift-amount-data retaining register is also carried out by the processor.

The processor carries out the switching control of the input switches SF1 to SFm and the switching control of the output destination switches SR1 to SRm, and issues a read-out instruction to the unit substitution tables M1 to Mm and a rotate shift instruction to the bit rotate shifter ROT.

Figure 20:
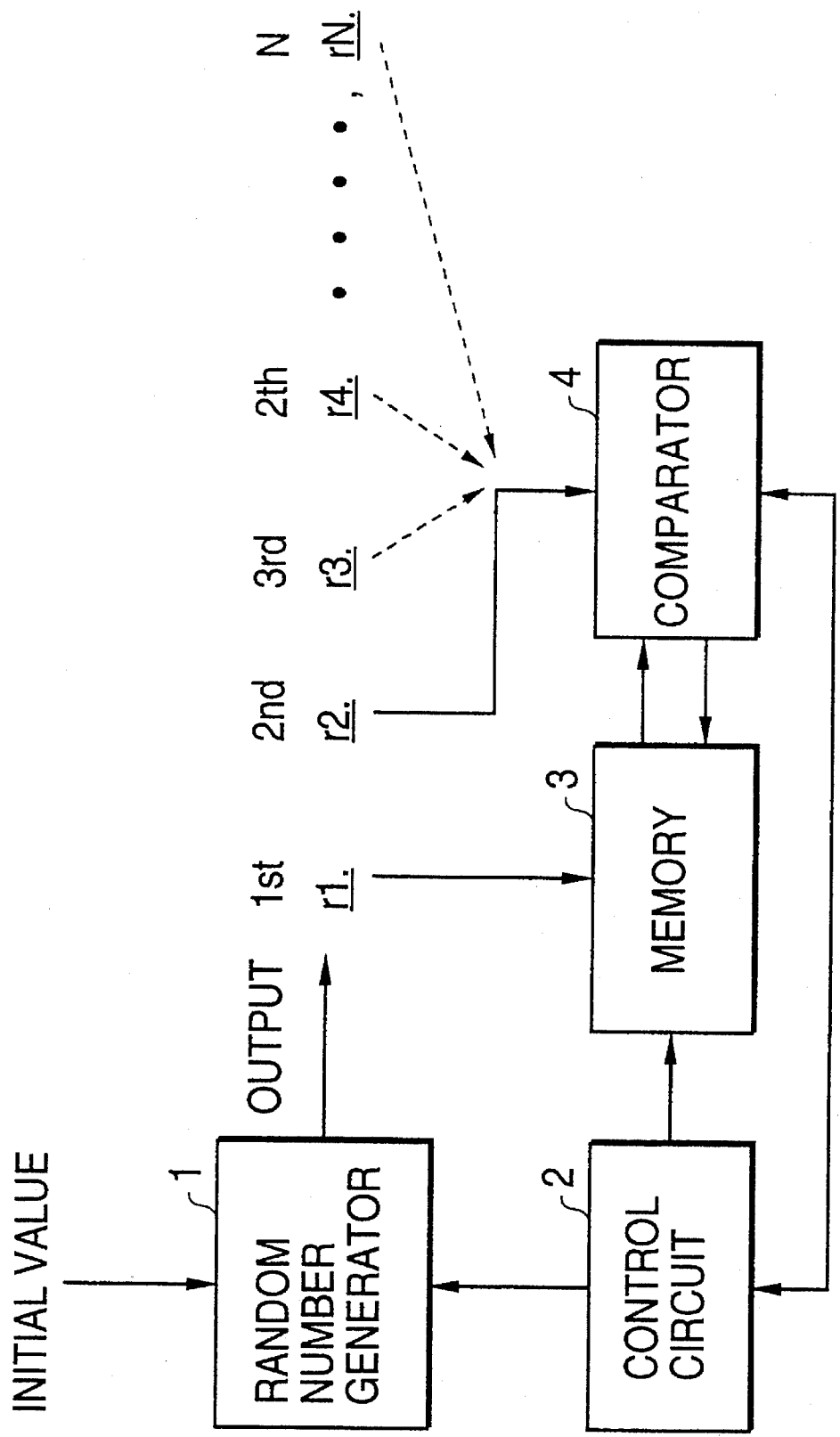
FIG. 20 is a block diagram illustrating an exemplary construction of a recombined sequence generator.

FIG. 20 shows an exemplary construction of the recombined sequence generator. In FIG. 20, there are shown a random number generator 1, control circuit 2, memory 3 and comparator 4. The control circuit 2 controls the random number generator 1 and memory 2, and can refer to comparison results obtained by the comparator 4. The output of the random number generator 1 is sent to the read-in data terminal of the memory 3 as well as to one input terminal of the comparator 4. The data read out of the memory 3 is sent to the other input terminal of the comparator 4.

The operation of the recombined sequence generator shown in FIG. 20 will hereinafter be described.

(1) The first data from the random number generator 1 is unconditionally employed and stored in the memory 3.

(2) The second data from the random number generator 1 is compared with the first data stored in the memory 3 by means of the comparator 4. If these data are different from each other, the second data is employed and stored in the memory 3 together with the first data. If these two data agree with each other, the third data is extracted from the random number generator 1 and compared with the first data stored in the memory 3. This process is repeated until data different from the first data stored in the memory 3 is extracted from the random number generator 1.

(3) The third data (data generated next to the second data stored in the memory 3) from the random number generator 1 is compared with the first and second data stored in the memory 3. If the third data is different from these data, the third data is employed and stored in the memory 3. If the third data agrees with either of these data, the forth data is extracted from the random number generator 1 and compared with the first and second data stored in the memory 3. This process is repeated until data different from the first and second data is extracted from the random number generator 1.

(4) More generally, the k-th data (data generated next to the (k−1)-th data stored in the memory 3) from the random number generator 1 is compared with the (k−1)-th, (k−2)-th, ... and first data. If the k-th data is different from these data, the k-th data is employed and stored in the memory 3. If the k-th data agrees with any of these data, the (k+1)-th data is extracted from the random number generator 1, and compared with the (k−1)-th, (k−2)-th, ... and first data stored in the memory 3. This process is repeated until data different from the (k−1)-th, (k−2)-th, ... and first data is extracted from the random number generator 1.

(5) The resultant random number sequence is divided into blocks, and written in the substitution table Mi or input to a decoder of the permutation circuit.

Figure 21:
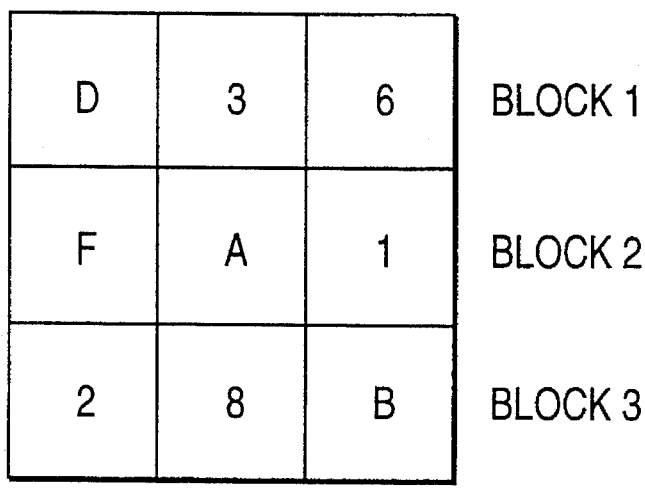
FIG. 21 is a diagram illustrating an exemplary substitution table using a recombined sequence.

FIG. 21 is a diagram illustrating an exemplary substitution table utilizing the recombined sequence. In case that a random number sequence "D36FA3A1628 ..." is generated, for example, a random number sequence to be used for substitution table generating process is "D36FA128 ..." which is written in the memory 3. This random number sequence is written in a 3×3 substitution table, and thus the substitution table shown in FIG. 21 is completed.

Figure 22:
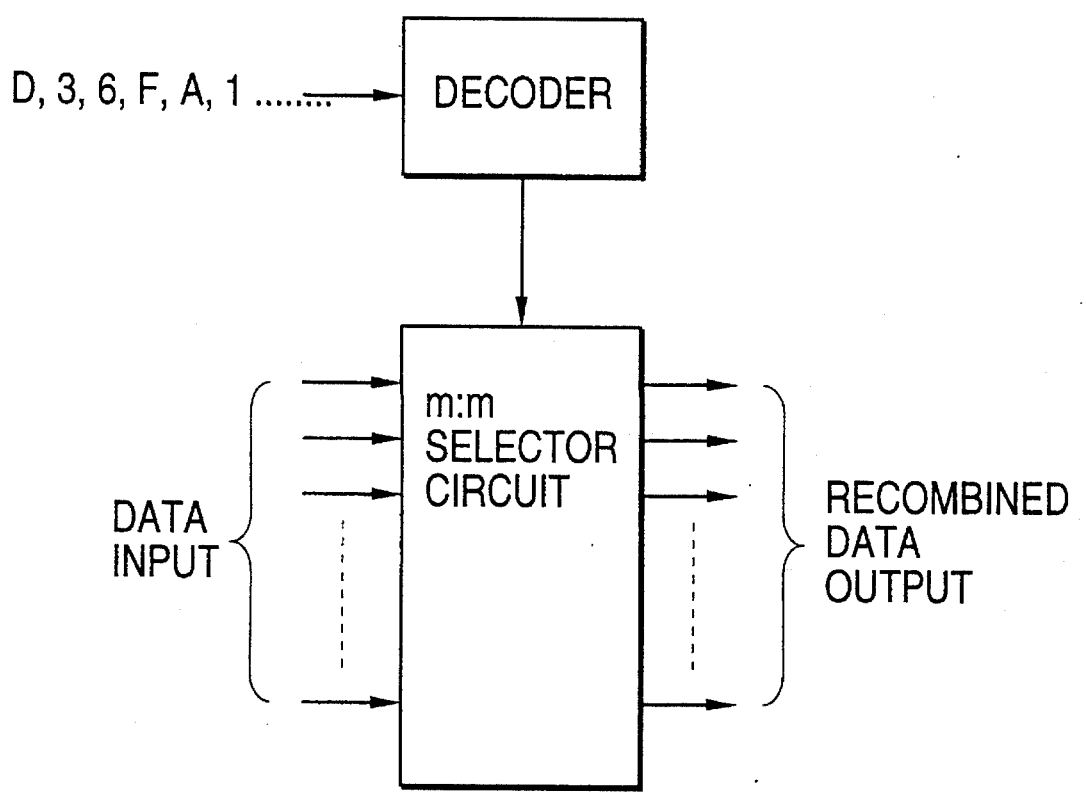
FIG. 22 is a diagram for explaining an exemplary control process of a permutation circuit using a recombined sequence.

FIG. 22 is a diagram illustrating an exemplary control process of the permutation circuit utilizing the recombined sequence. In FIG. 22, there are shown a decoder 5 and an m-to-m selector circuit 6. The random number sequence "D36FA1 . . ." for the process is input to the decoder 5. In the example shown in FIG. 23, the first, second and third input terminals of the selector circuit 6 are connected to the D-th, third and sixth output terminals thereof. Input data are thus recombined in the selector circuit 6 and output to the outside.

In accordance with the present invention, since the transformation pattern generating device generates a transformation pattern corresponding to a number sequence input as a key for the encryption, the transformation pattern is not a predetermined fixed one, but can be changed in a key-dependent manner. Therefore, an encryption function device invulnerable to differential attack can be realized.

That is, the utilization of this transformation pattern generating device makes it possible to variably change the type of data transformations (for example, permutation and substitution) in the encryption function device. Therefore, there is a great difficulty in counting the number of probable differential outputs for a particular differential input, and it is virtually impossible to cryptanalyze through the differential attack a ciphertext obtained by way of the encryption function device of the present invention.

Similarly, the transformation pattern generating device is capable of variably generating permutation patterns or substitution tables can also realize an encryption function device invulnerable to differential attack.

In case of a cryptographic system including N rounds of encryption devices, a round-robin key search in the N-th round is virtually impossible even if significant differences among the (N−1) round characteristics are detected.

Further, the substitution table for 4-bit input and output data, for example, has 16! (16 factorial) variations. If these substitution table variations are to be each represented by a number sequence (or key), the number sequence requires about 30 bits in length.

Accordingly, an encryption function device utilizing two such substitution tables supposedly employs a key of about 60 bits, which is longer than the 48-bit key required for each round of encryption function device in the conventional DES. Therefore, the encryption function device of the present invention is apparently invulnerable to differential attack, compared with the conventional cryptosystem.

Further, substitution tables and permutation patterns of respective encryption functions of plural rounds can be all determined by generating random number sequences based on a fixed key input as a seed to the random number generator. Therefore, it is not necessary to increase the bit length of the key for determining plural substitution tables and permutation patterns, thereby reducing the storage area for storing the key.

Still further, in accordance with the present invention, the encryption function is capable of performing the recombination of mini-blocks obtained by dividing input data and the random substitution table process. Therefore, an encryption function having a high randomization effect can be realized, thereby providing a cryptographic system virtually unbreakable by differential attack.

What is claimed is:

1. An encryption function device, comprising:

key input means for inputting a key for encryption;

transformation pattern generating means for using the key as a key number sequence and for generating a transformation pattern using at least one of the key number sequence and a pseudo-random number sequence generated by a random number generator using the key number sequence as a seed; and transformation means for transforming data in accordance with the transformation pattern generated by said transformation pattern generating means, wherein the transformation pattern includes m substitution tables and a permutation circuit having m input terminals and m output terminals, wherein said transformation means includes:

m input switches, where m is an even number;

m output destination switches;

m exclusive-OR circuits; and a bit rotate shift mechanism having m input terminals and m output terminals; and wherein a j-th input switch in one switching state outputs a j-th mini-block which is one of m mini-blocks into which input data is divided, and the j-th input switch in another switching state outputs a mini-block sent from a j-th output destination switch;

the j-th output destination switch in one switching state outputs the j-th mini-block of the bit rotate shift means, and the j-th output destination switch in another switching state outputs the j-th mini-block of the bit rotate shift means to the j-th input switch;

an output of a k-th input switch is input to an address of a k-th substitution table, where k is between 1 and m/2;

an output of the k-th substitution table and an output of an (i+k−1)-th substitution table are input to a k-th exclusive-OR-circuit;

an output of an (i+k−1)-th exclusive-OR circuit is input to an address of the (i+k−1)-th substitution table;

an output of an (i+k−1)-th input switch and the output of the k-th substitution table are input to the (i+k−1)-th exclusive-OR circuit;

an output of the k-th exclusive-OR circuit is input to a k-th input terminal of the permutation circuit;

the output of the (i+k−1)-th substitution table is applied to an (i+k−1)-th input terminal of the permutation circuit;

a j-th output of the permutation circuit is input to a j-th input terminal of the bit rotation shift means; and the bit rotate shift means rotatively shifts entire data input to first to m-th input terminals.

2. An encryption function device as claimed in claim 1, wherein contents of the m substitution tables are changed in accordance with the at least one of the key number sequence and the pseudo-random number sequence.

3. An encryption function device as claimed in claim 1, wherein a permutation mode of the permutation circuit is changed in accordance with the at least one of the key number sequence and the pseudo-random number sequence.

4. An encryption function device as claimed in 2, wherein a permutation mode of the permutation circuit is changed in accordance with the at least one of the key number sequence and the pseudo-random number sequence.

5. An encryption function device of claim 1, wherein a shift amount of the bit rotation shift means is changed in accordance with the at least one of the key number sequence and the pseudo-random number sequence.

6. An encryption function device of claim 2, wherein a shift amount of the bit rotation shift means is changed in accordance with the at least one of the key number sequence and the pseudo-random number sequence.

7. An encryption function device of claim 3, wherein a shift amount of the bit rotation shift means is changed in accordance with the at least one of the key number sequence and the pseudo-random number sequence.

8. An encryption function device of claim 4, wherein a shift amount of the bit rotation shift means is changed in accordance with the at least one of the key number sequence and the pseudo-random number sequence.

9. An encryption function device of claim 1, wherein the number of times of feeding back data from the m output destination switches to the m input switches is changed in accordance with the at least one of the key number sequence and the pseudo-random number sequence.

10. An encryption function device of claim 2, wherein the number of times of feeding back data from the m output destination switches to the m input switch is changed in accordance with the at least one of the key number sequence and the pseudo-random number sequence.

11. An encryption function device of claim 3, wherein the number of times of feeding back data from the m output destination switches to the m input switch is changed in accordance with the at least one of the key number sequence and the pseudo-random number sequence.

12. An encryption function device of claim 4, wherein the number of times of feeding back data from the m output destination switches to the m input switch is changed in accordance with the at least one of the key number sequence and the pseudo-random number sequence.

13. An encryption function device of claim 5, wherein the number of times of feeding back data from the m output destination switches to the m input switch is changed in accordance with the at least one of the key number sequence and the pseudo-random number sequence.

14. An encryption function device of claim 6, wherein the number of times of feeding back data from the m output destination switches to the m input switch is changed in accordance with the at least one of the key number sequence and the pseudo-random number sequence.

15. An encryption function device of claim 7, wherein the number of times of feeding back data from the m output destination switches to the m input switch is changed in accordance with the at least one of the key number sequence and the pseudo-random number sequence.

16. An encryption function device of claim 8, wherein the number of times of feeding back data from the m output destination switches to the m input switch is changed in accordance with the at least one of the key number sequence and the pseudo-random number sequence.

* * * * *